United States Patent
Huang et al.

(10) Patent No.: US 10,297,048 B2
(45) Date of Patent: May 21, 2019

(54) SEGMENTATION AND SPECTRUM BASED METAL ARTIFACT REDUCTION METHOD AND SYSTEM

(71) Applicant: Carl Zeiss X-ray Microscopy, Inc., Pleasanton, CA (US)

(72) Inventors: Zhifeng Huang, Pleasanton, CA (US); Thomas A. Case, Walnut Creek, CA (US)

(73) Assignee: Carl Zeiss X-Ray Microscopy, Inc., Pleasanton, CA (US)

( * ) Notice: Subject to any disclaimer, the term of this patent is extended or adjusted under 35 U.S.C. 154(b) by 168 days.

(21) Appl. No.: 15/337,075

(22) Filed: Oct. 28, 2016

(65) Prior Publication Data

US 2017/0109904 A1    Apr. 20, 2017

Related U.S. Application Data

(63) Continuation-in-part of application No. PCT/US2015/028032, filed on Apr. 28, 2015.

(60) Provisional application No. 61/985,856, filed on Apr. 29, 2014.

(51) Int. Cl.
| | |
|---|---|
| G06K 9/00 | (2006.01) |
| G06T 11/00 | (2006.01) |
| G06T 5/00 | (2006.01) |
| H04N 5/32 | (2006.01) |

(52) U.S. Cl.
CPC ............ *G06T 11/008* (2013.01); *G06T 5/002* (2013.01); *H04N 5/32* (2013.01); *G06T 2211/40* (2013.01); *G06T 2211/408* (2013.01)

(58) Field of Classification Search
None
See application file for complete search history.

(56) References Cited

U.S. PATENT DOCUMENTS

| | | | |
|---|---|---|---|
| 6,507,633 B1 | 1/2003 | Elbakri et al. | |
| 7,443,953 B1 | 10/2008 | Yun et al. | |
| 8,023,767 B1 | 9/2011 | Ning et al. | |
| 2004/0184574 A1* | 9/2004 | Wu | A61B 6/032 378/5 |
| 2005/0123089 A1 | 6/2005 | De Man | |
| 2005/0123215 A1 | 6/2005 | De Man | |

(Continued)

FOREIGN PATENT DOCUMENTS

KR    10-2010-0045277    5/2010

OTHER PUBLICATIONS

International Preliminary Report on Patentability, dated Nov. 10, 2016, from International Application No. PCT/US2015/028032, filed on Apr. 28, 2015. Nine pages.

(Continued)

*Primary Examiner* — Sean M Conner
(74) *Attorney, Agent, or Firm* — HoustonHogle LLP

(57) ABSTRACT

A segmentation-and-spectrum-based metal artifact reduction (MAR) system and method is applied in polychromatic X-ray CT system that uses a priori knowledge of high-Z metals in samples which contribute the primary artifacts at a known x-ray energy spectrum. Using a basis materials decomposition, the method solves the problem of reducing or eliminating metal artifacts associated with beam hardening using only a single scan of the sample performed at selected x-ray energy.

29 Claims, 13 Drawing Sheets

(56) References Cited

U.S. PATENT DOCUMENTS

| | | | | |
|---|---|---|---|---|
| 2012/0008845 A1* | 1/2012 | Ning | ................... | A61B 6/032 |
| | | | | 382/131 |
| 2014/0185901 A1* | 7/2014 | Edic | ................... | G06T 11/003 |
| | | | | 382/132 |
| 2014/0369458 A1* | 12/2014 | Shen | ................... | G01N 23/046 |
| | | | | 378/5 |
| 2015/0131883 A1* | 5/2015 | Taguchi | ............... | A61B 6/4241 |
| | | | | 382/131 |
| 2016/0217596 A1* | 7/2016 | Koehler | ............... | G06T 11/006 |

OTHER PUBLICATIONS

International Search Report and Written Opinion of the International Searching Authority, dated Jul. 10, 2015 from International Application No. PCT/US2015/028032, filed on Apr. 28, 2015. Eleven pages.

Mohapatra, S., "Development and quantitative assessment of a beam hardening correction model for preclinical micro-CT," MS (Master of Science) Thesis, University of Iowa, http://ir.uiowa.edu/etd/3500 (Dec. 2012). Ninety-one pages.

Ramakrishna, K., et al., "Beam-Hardening in Simulated X-Ray Tomography," Nuchlear & Mechanical Engineering, Indian Institute of Technology, Kanpur India (Jan. 19, 2006). Nine pages.

\* cited by examiner

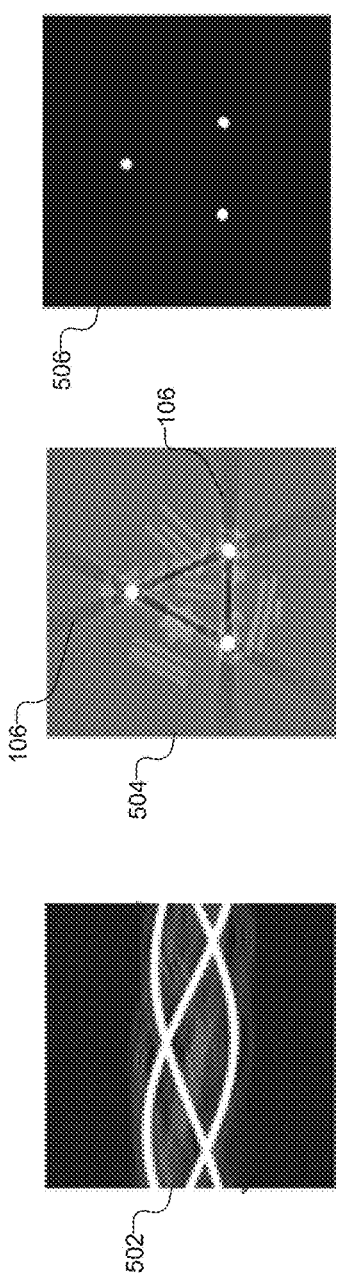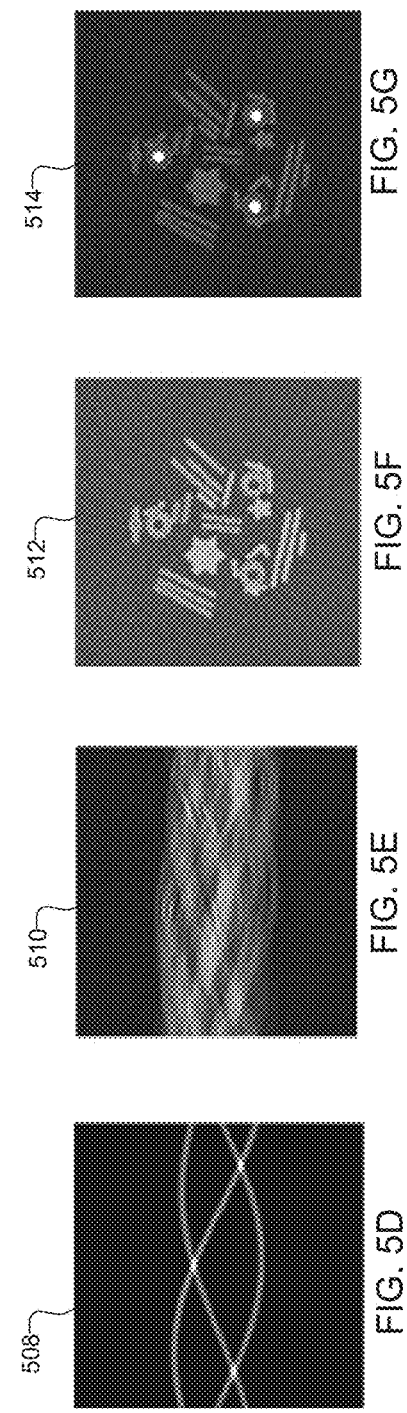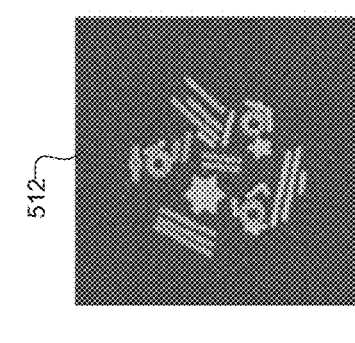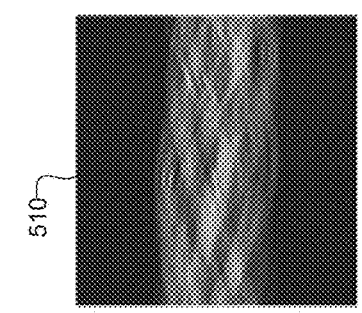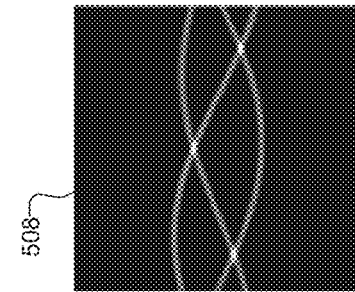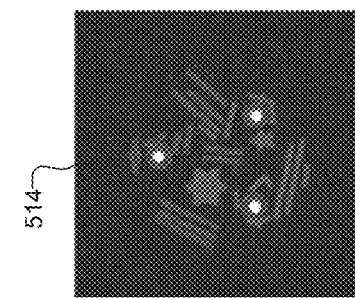

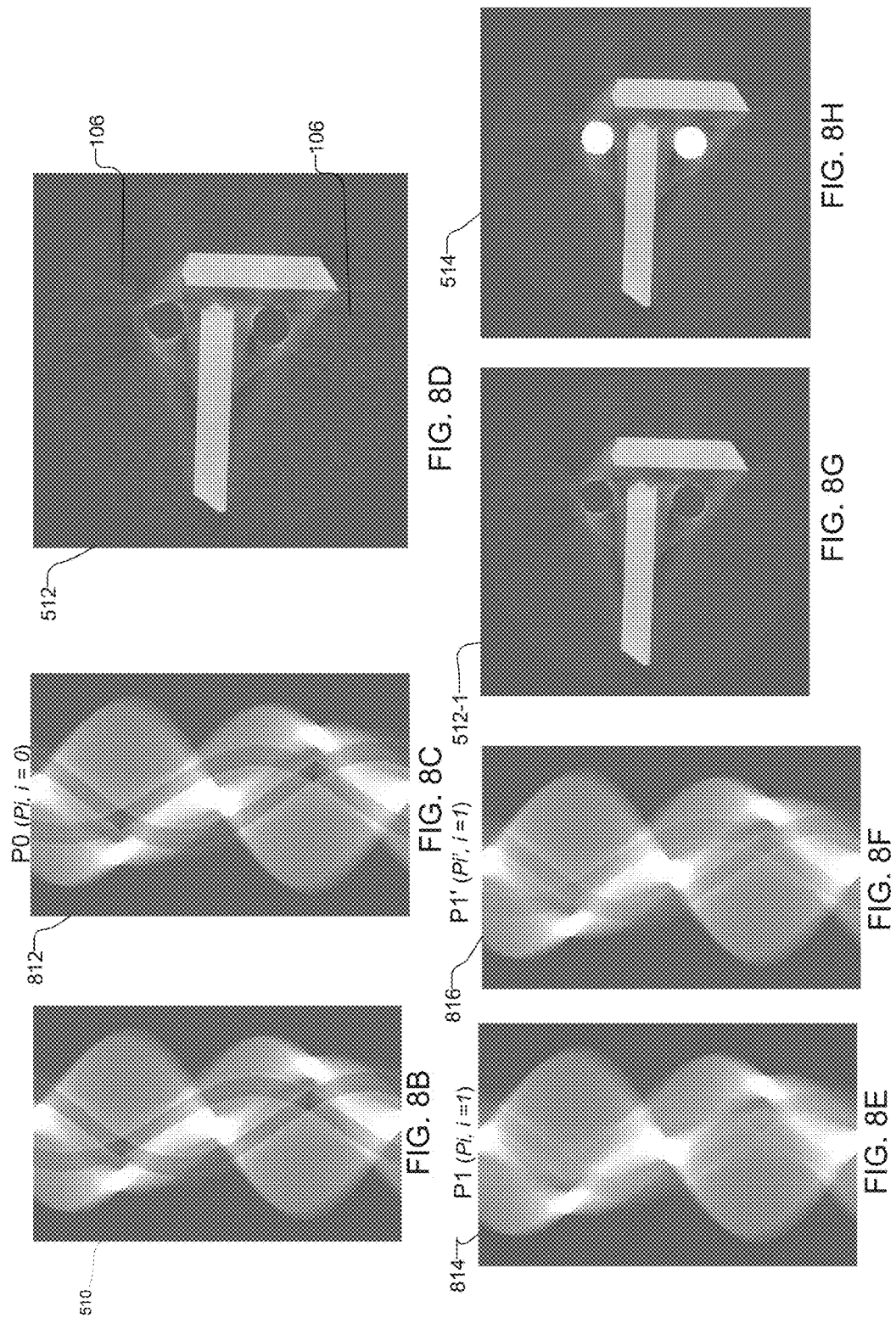

SEGMENTATION AND SPECTRUM BASED METAL ARTIFACT REDUCTION METHOD AND SYSTEM

RELATED APPLICATIONS

This application is a Continuation In Part Application of PCT Application No. PCT/US2015/028032, filed on Apr. 28, 2015, which designates the United States. PCT Application No. PCT/US2015/028032, in turn, claims the benefit under 35 U.S.C. § 119(e) of U.S. Provisional Application No. 61/985,856, filed on Apr. 29, 2014. Both PCT Application No. PCT/US2015/028032 and U.S. Provisional Application No. 61/985,856 are incorporated herein by reference in their entirety.

BACKGROUND OF THE INVENTION

X-ray computed tomography (CT) is a non-destructive technique for inspecting and analyzing internal structures of samples. In general, x-rays are absorbed or scattered by the sample as the X-rays travel through the sample. The X-rays not absorbed or scattered away are transmitted through the sample and then are detected by a detector system. The image formed at the detector system is known as an x-ray projection. Tomographic volume data sets are reconstructed from a series of these projections at different angles via standard CT reconstruction algorithms. X-ray tomography systems often present these tomographic volumes in two-dimensional, cross-sectional images or "slices" of the tomographic volume data sets.

Some x-ray tomography systems utilize polychromatic X-ray beams to generate the x-ray projections. Polychromatic x-rays sources include x-ray tubes (laboratory sources) or white synchrotron beams, or accelerator-based sources. The advantage of polychromatic x-ray beams is that they are typically more powerful that monochromatic beams for a given source since lossy energy filters are not necessary.

When using a polychromatic beam, the transmitted x-ray intensity is generally no longer proportional to the material thickness since lower energies are absorbed first as the beam traverses the object. As a result, a phenomenon known as beam hardening (BH) often occurs when polychromatic beams are used to generate x-ray projections. Beam hardening is associated with a change in transmitted X-ray spectrum towards higher X-ray energies as the X-rays pass through the sample.

Beam hardening often yields artifacts in tomographic reconstructions with polychromatic X-rays. Typical artifacts generated as a consequence of beam hardening include cupping artifacts and streak artifacts. Beam hardening can be corrected effectively for objects that consist only of one material by linearization of the absorption versus material thickness. This method is not effective for mixed material objects, especially objects containing both low density (low-Z) materials and high density (high-Z) materials, however. Because high-Z elements such as metals or elements with an atomic number higher than 18, such as Iron (Fe) and Gold (Au), absorb much more X-rays than low-Z elements, such as Silicon (Si), Carbon (C), Nitrogen (N) and Oxygen (O), metal element structures typically produce more serious beam hardening artifacts when exposed to X-rays. These artifacts are also known as 'metal artifacts'. In addition, factors other than beam hardening can cause the creation of metal artifacts such as x-ray scattering, Poisson noise, and motion and edge effects.

Current approaches to metal artifact reduction (MAR) in X-ray CT images typically fall into three groups. The first group, Group 1, uses N-order polynomial fitting to do beam-hardening correction to reduce metal artifacts. Here we call this method 'BHC (beam-hardening correction)'. The second group, Group 2, focuses on segmentation/subtraction of metals in the projections, followed by completion methods with analytical or iterative algorithms. The third group, or Group 3, uses a spectrum-based or physical modeling approach to statistically and iteratively reduce or suppress the artifacts.

Each of these artifact reduction approaches has drawbacks. Group 1 MAR methods can only reduce artifacts approximately and work properly only for one kind of metal. Group 2 MAR methods typically only provide partial suppression of the artifacts, and can introduce new blurring artifacts around metals in the sample. This is because information about structures in the sample shadowed by the metal are erased. In contrast, Group 3 MAR methods can theoretically reduce or eliminate most metal artifacts and typically achieve better results since they do not erase information present in the projections. The computational efficiency of Group 3 methods is low, however, because of the large number of iterative processing steps required.

SUMMARY OF THE INVENTION

The present invention is a segmentation-and-spectrum-based MAR method that uses a basis materials decomposition procedure. The method solves the problem of reducing or eliminating artifacts associated with beam hardening using only a single scan of the sample performed at a known X-ray energy spectrum, while also not erasing the information shadowed by the metal. This improves upon the current Group 2 and Group 3 approaches to MAR.

The invention can combine some advantages of the Group 2 and Group 3 MAR approaches while avoiding some of their disadvantages. Unlike the Group 1 approach, the new MAR approach of the invention can work for multiple kinds of metal. Unlike the Group 2 approaches, the MAR approach of the invention can minimize the introduction of any new artifacts and provide details around metallic structures in the CT reconstructed images of the sample. Unlike the Group 3 approaches, the MAR approach of the invention could be non-iterative or optionally require only 2 or 3 iterations in total (i.e., low computation consumption) and in theory can remove metal artifacts based on spectrum-related beam hardening physics.

Embodiments of the MAR method of the present invention utilize a priori knowledge about both the spectral energy distribution (i.e., spectrum) of the polychromatic x-rays incident upon the sample (the energy spectrum here is also combined with the detective sensitivity of the detector) and the physical properties of one primary high-Z metal in the sample that contributes to the creation of the primary artifacts. In one example, gold (Au) is the primary metal (high-Z element/material) in semiconductor-like samples, and contributes the primary artifacts.

First, the original projections are regarded as baseline projections. Using the baseline projections of the sample, the method might generate a baseline tomographic volume data set of the sample via standard Filtered Back Projection/Feldkamp-Davis-Kress (FBP/FDK) reconstruction algorithms, for example.

Then, a segmented high-Z metal volume data set is created for the high-Z metal selected from the baseline tomographic volume data set. Then a set of projections only associated with high-Z metal are generated by forward projecting the segmented high-Z metal volume data set, that is, creating forward-projected high-Z metal projections. The high-Z projections are associated with the thickness of the segmented high-Z element at each projection angle within the segmented high-Z volume data set.

A concept of basis materials decomposition is adopted in the method. It is assumed that other materials of the sample other than the high-Z metal can be 'expressed' or represented by one selected or supposed low-Z element/material, i.e., silicon (Si) or carbon (C), also known as an 'equivalent low-Z element'. As a result, the sample is preferably modeled as comprising a few, such as two, basis materials: a high-Z metal element and an equivalent low-Z element, including the same baseline projections utilized for the selected x-ray spectrum.

Using a relationship between the baseline projections and the two basis materials, the method calculates a set of projections associated with the thickness of the equivalent low-Z element, such as, at each projection angle formed when rotating the sample in the X-ray beam during the CT scan of the sample. These are also referred to as a set of equivalent low-Z element projections. A lookup table (LUT) technique is the most general way to determine this relationship.

The embodiments of the MAR method then utilize the equivalent low-Z element projections to create beam hardening corrected tomographic volume data sets of the sample, also known as corrected tomographic volume data sets. The embodiments utilize the equivalent low-Z element projections in different ways and in conjunction with different images associated with high-Z structures of the sample.

According to a first embodiment, the method first reconstructs an equivalent low-Z tomographic volume data set from the equivalent low-Z element projections.

In general, x-ray CT systems have been limited by the resolution they can provide. This resolution limit induces unexpected drifts in LUTs. These drifts cause potentially new artifacts to be introduced into the equivalent low-Z element projections created using the LUTs. In order to correct the artifacts introduced by the drifts, one or more of the following operations are typically performed:

1) A Gaussian blur of the forward-projected high-Z metal projection data set to match the CT system resolution limit;

2) Performing a filtering operation that removes tips (also called spikes or sharp edges) from the equivalent low-Z element projections and removes abnormal negative values (i.e., non-negative constraint) from the equivalent low-Z element projections; and 3) An optional iterative operation between the forward-projected equivalent low-Z projections and the filtered equivalent low-Z projections.

With the help of the above operations, the method provides an equivalent low-Z tomographic volume data set that corrects additional artifacts introduced due to resolution limits of current X-ray CT systems.

Finally, the method for the first embodiment fuses the segmented high-Z metal volume data set with the equivalent low-Z tomographic volume data set to create a fused tomographic volume data set of the sample with artifacts significantly reduced or entirely removed. Because the fused tomographic volume data set includes beam hardening correction, it is also known as a corrected tomographic volume data set.

Additional operations can also be executed to address unexpected artifacts in the upper/lower slices of the reconstructed images for the metal objects, because insufficient pixels representing the metal in these slices may cause errors from basis materials decomposition in 3D reconstruction. To address this, a second embodiment of the MAR method is disclosed.

As in the first embodiment, the second embodiment of the method creates a fused tomographic volume data set from the segmented high-Z metal volume data set and the equivalent low-Z tomographic volume data set. In addition, several additional operations are performed as follows:

1) Identify the locations of the metal edges in the upper/lower slices in the 3D tomographic volume data.

2) Blend the fused tomographic volume data with baseline (or BHC) tomographic volume data set in these identified slices to create the corrected tomographic volume data set.

Finally, yet another, third, embodiment of the MAR method is disclosed that focuses on processing in image projection space, in conjunction with selection of a monochromatic x-ray energy value. For this purpose, the method first normalizes and blurs the set of high-Z projections. Then, the method fuses the equivalent low-Z projections with the normalized high-Z projections, based upon a selected monochromatic x-ray energy, to create corrected monochromatic fused projections at the selected x-ray energy. Then, the method reconstructs a corrected tomographic volume data set from the corrected monochromatic fused projections.

In general, according to one aspect, the present invention features a data acquisition and image reconstruction method for reducing artifacts, such as metal artifacts, in an x-ray CT system. The method comprises creating a set of baseline projections such as by rotating the sample in an x-ray beam from an x-ray source of the x-ray CT system. A baseline tomographic volume data set of the sample is created from the set of baseline projections.

The high-Z structures are segmented from the baseline tomographic volume data set to create a segmented high-Z volume data set. A set of high-Z projections can be generated by performing one or more forward projections of the segmented high-Z metal volume data set.

A set of equivalent low-Z element projections is generated using the set of high-Z projections taking into account an energy spectrum of an x-ray beam. A basis materials decomposition procedure could be used according to a relationship among the baseline projections and basis materials. Finally, a corrected tomographic volume data set is generated using the set of equivalent low-Z element projections.

In a first embodiment, the method can further comprise fusing an equivalent low-Z tomographic volume data set created from the set of equivalent low-Z projections with the segmented high-Z metal volume data set to produce the corrected tomographic volume data set.

Preferably, the method creates the segmented high-Z metal volume data set by identifying a high-Z metal of the sample that contributes the metal artifacts, and selecting thresholds for segmenting the high-Z metal from the baseline tomographic volume data set.

Preferably, the basis materials of the basis materials decomposition procedure include a high-Z metal of the sample contributing the metal and an equivalent low-Z element representing other elements of the sample. Each of the equivalent low-Z projections in the set of equivalent low-Z projections provide information associated with a thickness of the equivalent low-Z element at each projection angle formed when rotating the sample in the X-ray beam. In addition, each of the high-Z projections in the set of high-Z projections provide information associated with a thickness of a high-Z metal of the sample at each projection angle formed when rotating the sample in the X-ray beam.

The basis materials decomposition procedure identifies X-ray attenuations of the equivalent low-Z element and the high-Z metal at the selected energy spectrum, and uses a Look Up Table (LUT) to determine the relationship among the baseline projections and the basis materials.

The method can use the LUTs to determine the relationship among the baseline projections and the basis materials. This relationship further comprises using the X-ray attenuations of the equivalent low-Z element and the high-Z metal at the selected energy spectrum for calculating thickness of the equivalent low-Z element. Preferably, the method further comprises performing a Gaussian blur of the forward-projected high-Z metal projections.

The method can identify new artifacts introduced during the generation of the set of equivalent low-Z element projections, and can reduce the new artifacts in the set of equivalent low-Z element projections. The method identifies a resolution limit of the X-ray CT system, the resolution limit causing the introduction of the new artifacts in the set of equivalent low-Z element projections.

Preferably, creating the equivalent low-Z tomographic volume data set from the set of equivalent low-Z element projections comprises filtering the equivalent low-Z projections by removing sharp edges and abnormal negative values from the equivalent low-Z element projections, and reconstructing the equivalent low-Z tomographic volume data set from the filtered set of equivalent low-Z projections.

The method preferably improves image quality in the equivalent low-Z tomographic volume data set by an optional iterative operation. The optional iterative operation comprises filtering the equivalent low-Z projections by removing sharp edges and abnormal negative values from the equivalent low-Z element projections, creating a new set of equivalent low-Z element projections by performing forward projection of the equivalent low-Z tomographic volume data set, identifying portions of the sample shadowed by high-Z metals of the sample, creating a set of integrated low-Z projections by performing an integration of the filtered set of equivalent low-Z element projections and the new set of equivalent low-Z element projections for the identified portions of the sample, reconstructing a new equivalent low-Z tomographic volume data set from the set of integrated low-Z projections, and using the new equivalent low-Z tomographic volume data set as the equivalent low-Z tomographic volume data set, and possibly repeating the above operations as needed to improve image quality in the equivalent low-Z tomographic volume data set.

According to a second embodiment, the method preferably improves image quality in the corrected tomographic volume data set by additional operations. The additional operations comprise identifying the locations of the metal edges in the upper/lower slices of metal objects in the 3D tomographic volume data and blending the MAR fused tomographic volume data with baseline (or BHC) tomographic volume data set in these identified slices.

Also according to the second embodiment, the method further identifies locations of high-Z edges in upper and lower slices within the baseline tomographic volume data set, creates an equivalent low-Z volume data set from the equivalent low-Z projections, fuses the equivalent low-Z volume data set with the segmented high-Z volume data set to create a fused tomographic volume data set, and blends the fused tomographic volume data set and the baseline tomographic volume data set at the locations of the high-Z edges in the upper and lower slices within the baseline tomographic volume data set to create a blended tomographic volume data set as the corrected tomographic volume data set.

According to the third embodiment, the method further generates a set of high-Z thickness projections based on a thickness of the high-Z structures of the segmented high-Z volume data set, generates a set of high-Z x-ray attenuated projections based on x-ray attenuation of the high-Z structures of the segmented high-Z volume data set, creates a set of normalized high-Z projections by normalizing the set of high-Z x-ray attenuated projections with the set of high-Z thickness projections, fuses the equivalent low-Z projections with the normalized high-Z projections, based upon a selected monochromatic x-ray energy of the energy spectrum of the x-ray beam, to create a set of monochromatic fused projections at the selected x-ray energy, and reconstructs the corrected tomographic volume data set from the monochromatic fused projections.

In general, according to another aspect, the present invention features an X-ray CT system and image reconstruction method for reducing metal artifacts in an X-ray CT system. The system comprises an X-ray imaging system that generates a set of baseline projections by rotating the sample relative to an X-ray beam and a computer system. The computer system creates a baseline tomographic volume data set of the sample from the set of baseline projections, preferably creates a segmented high-Z metal volume data set of the sample from the baseline tomographic volume data set and generates a set of high-Z projections, generates a set of equivalent low-Z element projections such as by a basis materials decomposition procedure, and generates a corrected tomographic volume data set using the equivalent low-Z element projections, and possibly repeats the above operations as needed to improve image quality.

The computer system can further fuse the equivalent low-Z tomographic volume data set and the segmented high-Z metal volume data set to produce a fused tomographic volume data set. The fused tomographic volume data set can be regarded as the final tomographic volume data set. But if artifacts induced by insufficient pixels exist in the upper/lower slices of the metal objects in the fused tomographic volume data set, the computer system generates a blended tomographic volume data as the final tomographic volume data set from the MAR fused tomographic volume data with baseline (or BHC) tomographic volume data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 5A-5G show images associated with output at different steps of the methods of FIGS. 3A and 3B, with FIG. 5A showing a set of baseline projections from a CT scan of the sample, FIG. 5B showing a baseline tomographic image of the sample created from the baseline projections of FIG. 5A, FIG. 5C showing a segmented high-Z metal image subtracted from the baseline tomographic image of FIG. 5B, FIG. 5D showing high-Z projections created from forward projection of the segmented high-Z metal image of FIG. 5C, FIG. 5E showing a set of equivalent low-Z projections associated with the thickness of the equivalent low-Z element, FIG. 5F showing an equivalent low-Z tomographic image, and FIG. 5G showing a final tomographic image of the sample with artifacts removed;

FIGS. 8A-8H show resulting images for an exemplary sample that has been processed using the MAR method of the present invention, wherein the MAR method uses an optional iterative operation to reduce unexpected metal artifacts introduced into the images due to MAR system resolution limits, for improving image quality;

DETAILED DESCRIPTION OF THE PREFERRED EMBODIMENTS

Figure 1A:
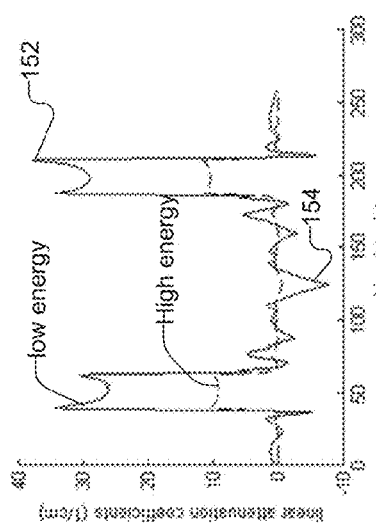
FIGS. 1A-1F illustrate beam hardening and metal artifacts for a sample scanned with polychromatic X-rays, with FIG. 1A showing a phantom design of an exemplary sample including high-Z metallic element structures, FIG. 1B showing two X-ray energy spectra at 70 kV (low energy) and 150 kV (high energy), respectively, including the influence of the detector sensitivity, FIGS. 1C and 1D showing metal artifacts in the tomographic images from a low energy scan and a high energy scan, respectively, and FIGS. 1E and 1F showing plots of linear attenuation coefficients as a function of a line profile in the low energy tomographic image and the high energy tomographic image of the sample, respectively, the metal artifacts in the low-energy tomographic image being more serious than the metal artifacts in the high-energy tomographic image.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, it will be understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

For monochromatic X-rays, Beer's Law describes that X-rays will be attenuated when X-rays pass through a pure object:

$$I = I_0 e^{-\mu t}$$

where $I_0$ is the X-ray intensity incident on an object, t is the object thickness, and I is the intensity of X-rays transmitted through the object. $\mu$ is the attenuation coefficient of the object (including the effects of Photoelectric absorption and Compton scattering, and electron pair effect if X-ray energy >1.02 MeV), depending on the sample density $\rho$, the atomic number Z, atomic mass A, and the x-ray energy E.

The above formula can be re-written with an integral form $$I = I_0 e^{-\int \mu(l) dl} \text{ and}$$

$$\int \mu(l) dl = -ln(I/I_0)$$

where l is the beam path through the object. This perfectly satisfies the line integral demand of CT reconstruction algorithms. As a result, no beam hardening (BH) artifacts are introduced for monochromatic X-rays.

Polychromatic x-ray sources, on the other hand, generate x-rays over a spectrum D(E). D(E) also includes the influence of detector sensitivity for simplicity. The intensity I downstream of the object is given by $$I = I_0 \int D(E) e^{-\int \mu(E,l) dl} dE$$

$\mu(E)$ is typically a nonlinear function of E, given by $$\mu(E) = \alpha_1 * \frac{1}{E^3} + \alpha_2 * f_{KN}(E)$$

$$\alpha_1 \approx K_1 \frac{\rho}{A} Z^n, n \approx 4$$

(Photoelectric absorption component), and $$\alpha_2 \approx K_2 \frac{\rho}{A} Z$$

(Compton scattering component), where $f_{KN}$ is the Klein-Nishina formula.

Because µ(E) is typically a non-linear function of energy E, the transmission of X-rays from polychromatic x-ray sources does not satisfy the line-integral demand of CT reconstruction algorithms. $\mu_{high-energy} < \mu_{low-energy}$, meaning that the materials absorb 'more' low-energy X-rays than high-energy X-rays. The output spectrum of attenuated x-rays transmitted through the sample appears to 'move' to be harder, known as beam hardening (BH). High-Z metal materials have much more serious beam hardening problems, resulting in the typical metal artifacts present in CT reconstructed tomographic images of a sample.

FIG. 1A-1F illustrate the problem of beam hardening, and metal artifacts 106 that result from BH in two different X-ray energies that the method of the present invention addresses.

FIG. 1A shows a phantom design of a sample 114 including multiple high-Z and low-Z elements. The elements include Manganese (Mn), Iron (Fe), Nickel (Ni), Copper (Cu), Cobalt (Co), and Carbon (C).

Figure 1B:
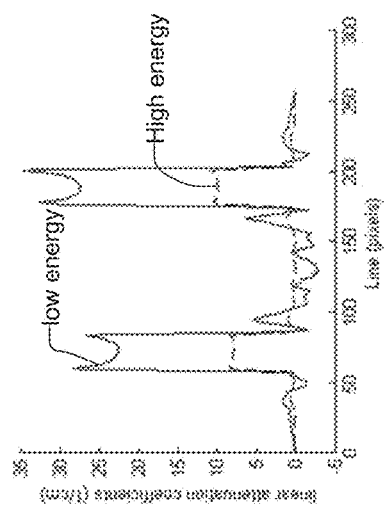

FIG. 1B shows two polychromatic X-ray spectra at a low energy @70 kV and a high energy @150 kV.

Figure 1C:
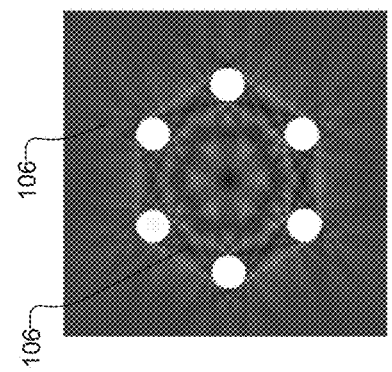
Figure 1D:
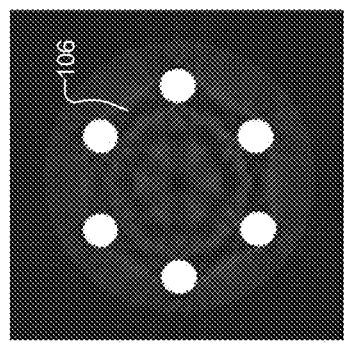

FIGS. 1C and 1D show reconstructed images of the sample 114 including uncorrected artifacts 106 due to beam hardening. FIG. 1C was created using a low-energy polychromatic x-ray source operated at 70 kV. On the other hand, FIG. 1D was created using a high-energy polychromatic x-ray source operated at 150 kV.

Figure 1E:
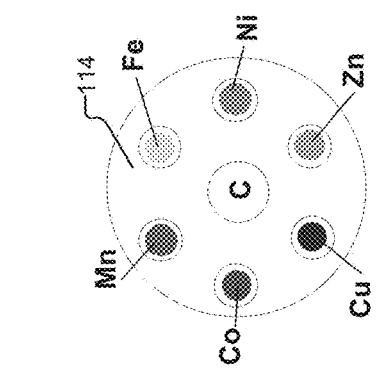
Figure 1F:
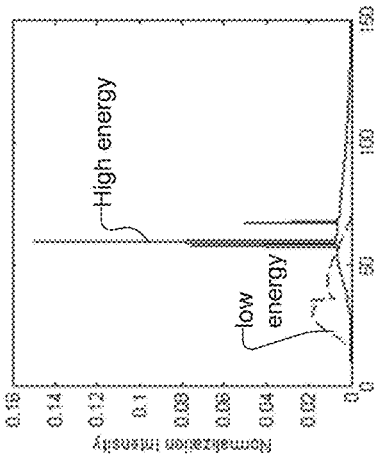

FIGS. 1E and 1F show profile comparisons of linear attenuation coefficients in the reconstructed images of the low-energy and high-energy scans. The metal and BH artifacts in the reconstructed images are energy-dependent, as illustrated. The metal and BH artifacts are more serious in the low-energy CT than in the high-energy CT. For example, the low energy attenuation coefficients exhibit peaking at the edges of the high-Z elements and troughs 154 in homogenous low-Z filler material.

Figure 2:
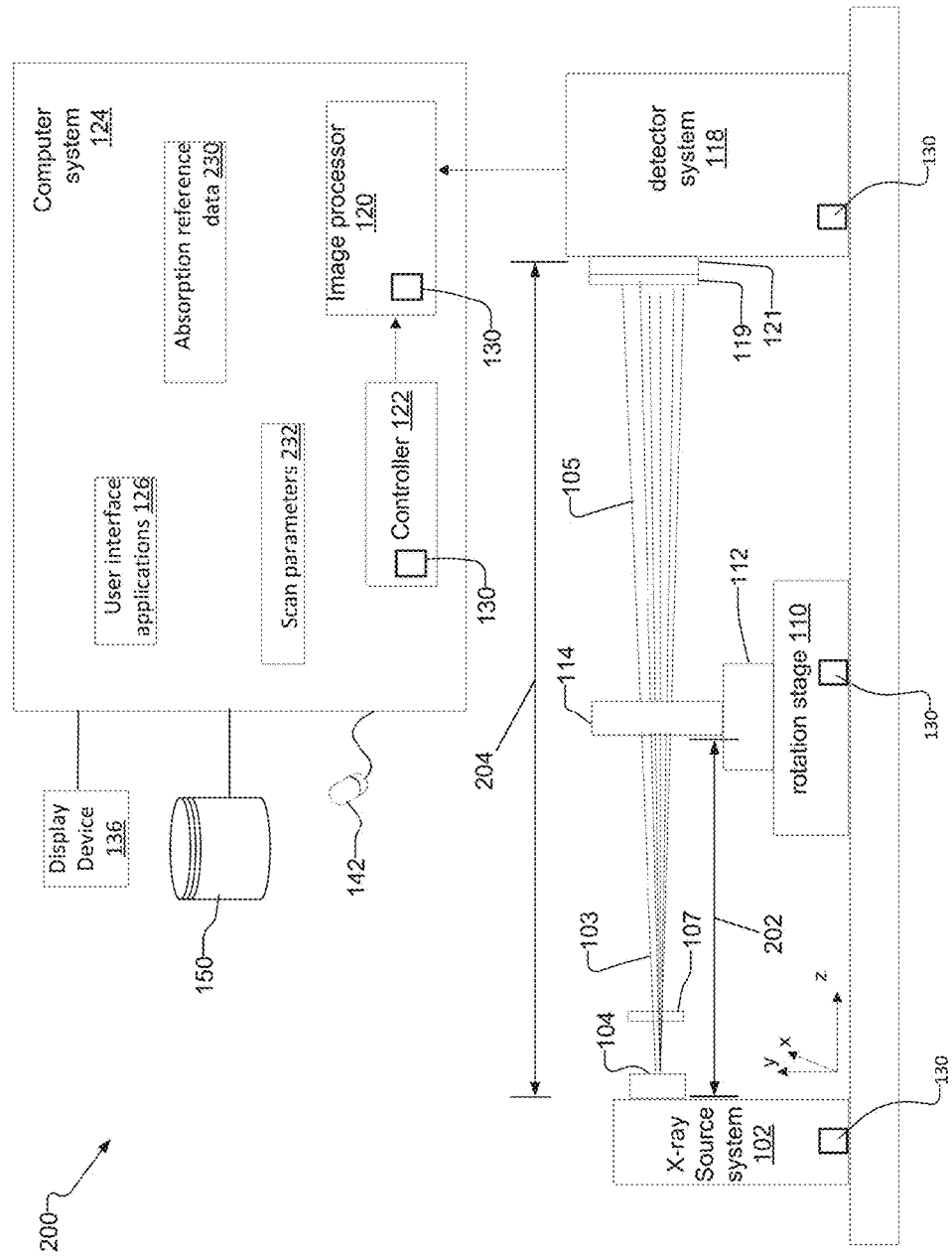
FIG. 2 is a schematic diagram of an x-ray CT system to which the method of the present invention is applicable.

FIG. 2 is a schematic diagram of an x-ray CT system 200 to which the method of the present invention is applicable. The x-ray CT system 200 includes an X-ray imaging system that has an X-ray source system 102 that generates a polychromatic X-ray beam 103 and a rotation stage 110 with sample holder 112 for holding the sample 114. Images or x-ray projections are captured by a detector system 118. A computer system 124 typically receives and processes these images and provides general control of the system 200.

The source 102 is preferably a "laboratory x-ray source" because of its ubiquity and relatively low cost. Nonetheless, synchrotron sources or accelerator-based sources are another alternative.

Source 102 can be an X-ray tube, in which electrons are accelerated in a vacuum by an electric field and shot into a target piece of metal, with x-rays being emitted as the electrons decelerate in the metal. Typically, such sources produce a continuous spectrum of background x-rays combined with sharp peaks in intensity at certain energies that derive from the characteristic lines of the selected target 104, depending on the type of metal target used. Furthermore, the x-ray beams are divergent and lack spatial and temporal coherence.

In one example, source 102 is a rotating anode type or microfocused source, with a Tungsten target. Targets that include Molybdenum, Gold, Platinum, Silver or Copper also can be employed. Preferably, a transmission configuration is used in which the electron beam strikes the thin target 104 from its backside. The x-rays emitted from the other side of the target 104 are used as the beam 103.

In another, more specific example, source 102 is a structured anode x-ray source such as described in U.S. Pat. No. 7,443,953 issued to Yun, et al. on Oct. 28, 2008, the contents of which are incorporated herein by reference in their entirety. In this case, the source 102 has a thin top layer made of the desired target material and a thicker bottom layer made of low atomic number and low density materials with good thermal properties. The anode can include, for instance, a layer of copper with an optimal thickness deposited on a layer of beryllium or diamond substrate.

X-ray lasers producing radiation having an energy suitable for the tomographic applications described herein also can be employed.

In still another example, the source 102 is a metal jet x-ray source such as are available from Excillum AB, Kista, Sweden. This type of source uses microfocus tubes in which the anode is a liquid-metal jet. Thus, the anode is continuously regenerated and already molten.

The source 102 is preferably located on a source z-axis stage that enables independent adjustment of source to sample distance (202).

The x-ray beam 103 generated by source 102 has an energy spectrum that is controlled typically by the operating parameters of the source. In the case of a laboratory source, dictating parameters include the material of the target and the acceleration voltage. The energy spectrum is also dictated by any conditioning filters that suppress unwanted energies or wavelengths of radiation. For example, undesired wavelengths present in the beam are eliminated or attenuated, using, for instance, an energy filter 107 (designed to select a desired x-ray wavelength range (bandwidth)). Nevertheless, the filter 107 does not substantially reduce the total energy or bandwidth of the transmitted beam 103. For example, the filter 107 preferably decreases the power in the beam 103 by no greater than 50%. In embodiments, it decreases the power in the beam by no greater than 30%. The relevance is that most of the polychromatic x-rays generated by the x-ray source 102 are preserved to illuminate the sample 114. In general, the bandwidth of the x-rays used are greater than 40% as defined by the ratio of the full width half maximum (FWHM) of the x-ray energy band to the central x-ray energy. E.g. for a central energy of 50 keV an energy band of at least 20 keV around the central energy is used. In general the bandwidth is at least 20%, since otherwise the available flux of the source is cut too severely, which reduces performance and/or slows operation.

When the sample 114 is exposed to the X-ray beam 103, the X-ray photons transmitted through the sample form an attenuated x-ray beam 105 that is received by the detector system 118. In some other examples, an objective lens is used to form an image onto detector system 118 of the X-ray imaging system.

A magnified projection image of the sample 114 is formed on the detector system 118 with a magnification that is equal to the inverse ratio of the source-to-sample distance 202 and the source-to-detector distance 204, using geometrical magnification. Generally, the geometrical magnification of x-ray stage is between 2 and 100, or more. In this case, the resolution of the x-ray image is limited by the focus spot size or virtual size of the X-ray source system 102.

To achieve high resolution, embodiments of the X-ray CT system 200 further utilize a very high resolution detector system 118 in conjunction with positioning the sample 114 close to the X-ray source system 102. In one implementation, a scintillator 119 is used in conjunction with a microscope objective 121 to provide additional magnification of between 2 and 100, or more.

For adjusting the geometrical magnification, the operator utilizes the user interface applications 126 on the computer system 124 to adjust the source-to-sample distance 202 and the source-to-detector distance 204. The operator adjusts these distances to achieve the desired geometrical magnification.

Typically based on operator defined parameters, the controller 122 of the computer system 124 instructs the rotation stage 110 to rotate the sample relative to the beam 103 to perform the CT scan via the controller 122. The X-ray detector system 118 also provides the ability to adjust the field of view of the sample 114 by changing the pixel size within the x-ray detector system 118, according to some implementations.

The detector system 118 creates an image representation, in pixels, of the X-ray photons from the attenuated X-ray beam 105 that interact with the scintillator 119 in the detector system 118. The image formed at the detector system 118 is also known as an x-ray projection or X-ray projection image.

In one example, the computer system 124 includes an image processor 120 and user interface applications 126. A display device 136, connected to the computer system 124, displays information from the X-ray CT system 200, typically in user interface applications 126 of the computer system 124. An input device 142 such as a touch screen or computer mouse enables interaction between the operator, the computer system 124, and the display device 136.

The computer system 124 loads information from and saves information to a database 150 connected to the computer system 124. The controller 122 has a controller interface 130 that allows an operator to control and manage components in the X-ray CT system 200 under software control via the computer system 124.

The controller 122 controls components that have a controller interface 130. Components having a controller interface 130 include the image processor 120, the detector system 118, the rotation stage 110, and the X-ray source system 102.

Using the user interface applications 126, the operator defines/selects CT scan parameters 232. These include X-ray voltage settings defining with the X-ray energy spectrum of the scan and exposure time on the X-ray source system 102. The operator also typically selects other settings such as the field of view of the X-ray beam 103 incident upon the sample 114, the number of X-ray projection images to create for the sample 114, and the angles to rotate the rotation stage 110 for rotating the sample 114 for an X-ray CT scan in the X-ray beam 103.

The computer system 124, with the assistance of its image processor 120, accepts the image or projection information from the detector system 118 associated with each rotation angle of the sample 114. The image processor 120 creates a separate projection image for each rotation angle of the sample 114, and combines the projection images using CT reconstruction algorithms to create 3D tomographic volume information for the sample.

Figure 3A:
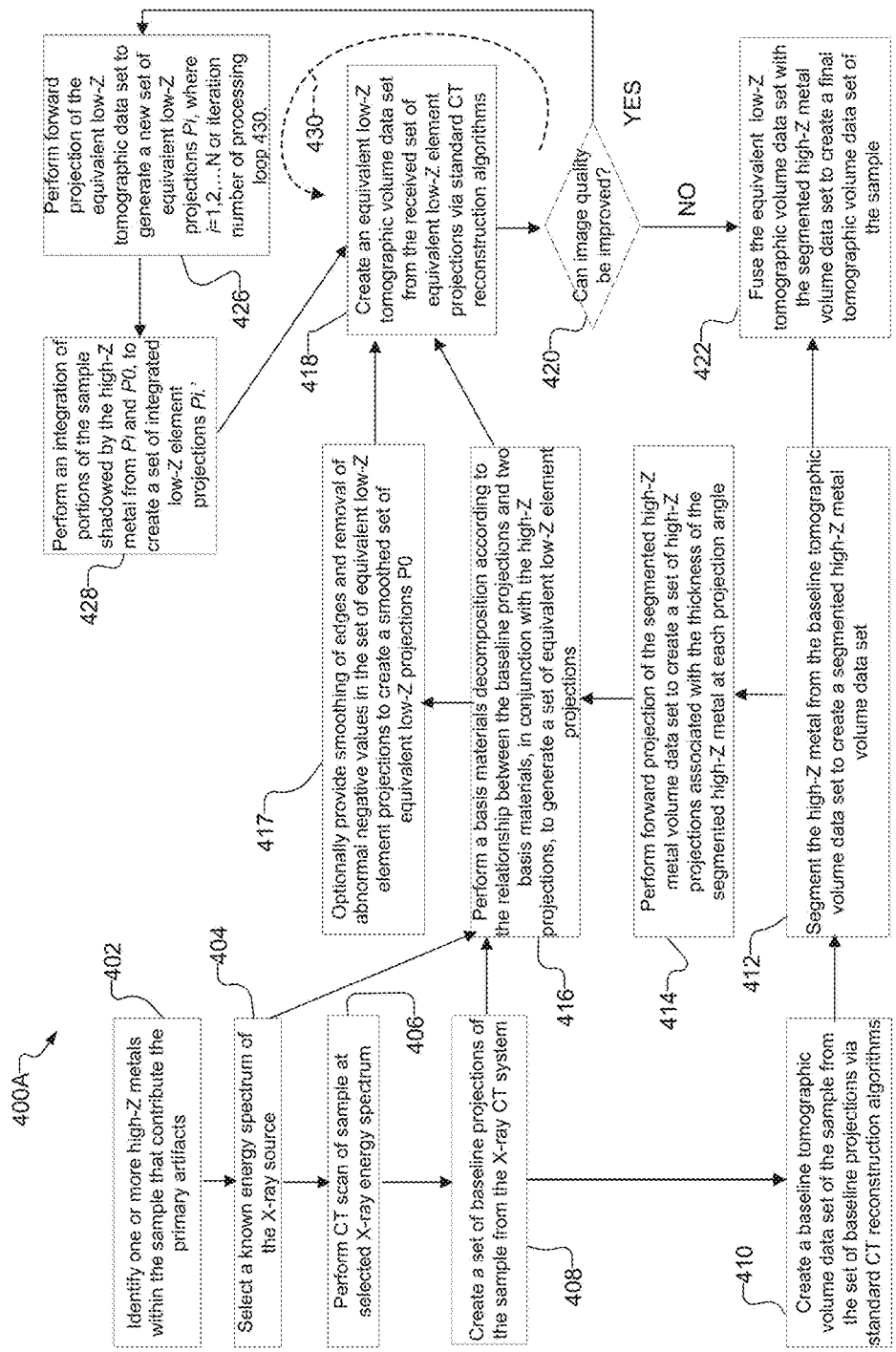
FIG. 3A is a flow chart showing a first embodiment of the 3D reconstruction method of the present invention.

FIG. 3A shows a flowchart that provides detail for a MAR method 400A of the invention that is executed by the image processor 120 of the computer system 124 or other computer system using the x-ray projections from the detector system 118.

In step 402, high-Z metals in the sample 114 that contribute the primary artifacts 106 are identified. Generally, there is a priori knowledge of the presence of high-Z elements in the sample that contribute to creation of the primary artifacts 106, and thus, the information is entered by an operator. For example, in most semiconductor manufacturing processes, the elemental constituents are known and well defined. In other examples, this information is determined by image analysis by the image processor 120. Preferably, one or more high-Z metals are selected.

In step 404, the operator selects a voltage setting of the X-ray source 102 that includes the influence of the sensitivity of the detector system 118. This operation is also known as defining an effective energy spectrum. In examples, selection of the effective energy spectrum is also associated with selecting filters 107 of the scan parameters 232.

According to step 406, the X-ray CT system 200 performs a CT scan of the sample 114 at the selected X-ray energy spectrum according to the scan parameters 232. In response to the scan, in step 408, the image processor 120 of the computer system 124 creates a set of baseline projections 502 of the sample 114 by rotating the sample in the X-ray beam 103 from the X-ray source 102 of the x-ray CT system 200. Moreover, in general, any scan trajectory can be used including spiral tomography where the sample is rotated and translated at the same time, along with other continuous and discontinuous trajectories.

An exemplary baseline projection 502 is shown in FIG. 5A. Note that this projection was based on a simulation using a one dimensional (1D) parallel beam. When using a 1D parallel beam, the set of baseline projections/image 502 is also called a 'sinogram'. In other, more typical scenarios, the illuminating X-ray beam has a conical shape, such as the X-ray beam 103 depicted in FIG. 2.

In step 410, the image processor 120 creates a baseline tomographic volume data set 504 of the sample from the baseline projections 502. The baseline tomographic volume data set 504 is often uncorrected for artifacts. Here, standard CT reconstruction algorithms can be used including filtered back projection and FDK method (FBP/FDK).

An exemplary image from the baseline tomographic volume data set 504 is shown in FIG. 5B. It contains obvious artifacts 106 emanating from high-Z material structures.

The image processor 120 then transitions to step 412 to segment a high-Z metal from the baseline tomographic volume data set 504 to create a segmented high-Z metal volume data set 506 that is used to create segmented high-Z metal images. In a fashion similar to current segmentation-based MAR methods, one or more thresholds are employed to segment the high-Z metal portions from the baseline tomographic volume data set 504 to create the segmented high-Z metal volume data set 506. Alternatively, other segmentation methods can be employed to isolate the high-Z metal features.

An exemplary segmented high-Z metal volume data set 506 is shown in FIG. 5C. It is characterized by white spots at the locations of the high-Z material(s).

In step 414, the image processor 120 performs forward projection of the segmented high-Z metal volume data set 506 to create forward-projected high-Z thickness projections 508. Each set of high-Z projections 508 provide information associated with the thickness of the high-Z metal at each projection angle that was used when rotating the sample 114 in the X-ray beam 103 when the baseline projections 502 were obtained.

An exemplary synthetic high-Z projection from the set 508 is shown in FIG. 5D. In more general cone beam geometry, 3D segmented high-Z metal volume images are created from 3D high-Z cone beam projections using 3D cone-beam forward projection techniques.

In practice, actual X-ray CT systems 200 have a resolution limit, causing edges of the objects in images to be blurred (compared with idealized step-function behavior of edges). A Gaussian blur of the forward projected high-Z metal projection set is therefore preferably performed in order to match the real system resolution limit.

In step 416, the image processor 120 of the computer system 124 performs a basis materials decomposition procedure according to a relationship among the baseline projections 502 and preferably two, or more basis materials at the selected energy, in conjunction with the set of forward-projected high-Z projections 508, to create or generate a set of equivalent low-Z element projections (P0) 510. The two basis materials preferably include a high-Z element of the sample 114 such as gold (Au), and an equivalent low-Z material, such as Si.

We hypothesize that all other materials (except the primary metal) in the sample 114 can be expressed or represented by an equivalent low-Z element. As part of this process, in the image processor 120, a lookup table (LUT) is employed in advance to determine a relationship between the thickness of two basis materials (i.e., high-Z metal element and the equivalent low-Z element), and their corresponding X-ray attenuations at the selected energy spectrum. More information regarding the use of the LUTs accompanies the description associated with FIGS. 4A and 4B, included hereinbelow.

In practice, due to resolution limits of X-ray CT systems 200, some drifts occur when adopting ideal LUTs. These drifts will cause unexpected phenomena in the equivalent low-Z projections (P0) 510, such as spikes at their edges, and abnormal negative values for portions of the sample shadowed by the high-Z metal. The effect of these phenomena on the equivalent low-Z projections 510 includes the introduction of new artifacts in images reconstructed from the projections. More details for removing the artifacts from the equivalent low-Z projections 510 accompanies the description for step 417, processing loop 430, and in FIG. 8A-8G, included hereinbelow.

In step 417, edge smoothing and removal of abnormal negative values can be performed on the set of equivalent low-Z element projections to create a smoothed set of equivalent low-Z projections P0, in the first embodiment.

Then, in step 418, the image processor 120 reconstructs the set of equivalent low-Z projections 510 into an equivalent low-Z tomographic volume data set 512, an example of which is shown in FIG. 5F. The image processor 120 typically uses standard CT reconstruction methods such as FBP/FDK when creating the equivalent low-Z tomographic volume data set 512 from the set of equivalent low-Z projections 510. The image processor 120 also typically performs an operation to filter or smooth edges (i.e., spikes) and removes abnormal negative values (i.e., non-negative constraint) from the equivalent low-Z element projections 510 prior to creating the equivalent low-Z tomographic volume data set 512.

According to step 420, the method determines if the image quality of the equivalent low-Z tomographic volume data set 512 can be improved. If the image quality is optimal or sufficient (for example, when the resolution limit of the X-ray CT system 200 providing the MAR method 400A is not a major factor, in some cases), then the MAR method transitions to step 422 directly to create the final tomographic volume data set 514 of the sample 114. More detail for the creation of the final tomographic volume data set 514 of the sample 114 accompanies the full description for step 422, included herein below.

When the resolution limit of the X-ray CT system 200 implementing the MAR method 400A is a factor that affects image quality, metal artifacts 106 remain in the equivalent low-Z tomographic volume data set 512. Because of the resolution limit in practice, LUT values for portions within the sample 114 that are shadowed by the high-Z metal are not calculated exactly. As a result, metal artifacts 106 remain in the equivalent low-Z tomographic volume data set 512. An exemplary equivalent low-Z tomographic volume data set 512 including metal artifacts is shown in FIG. 8D.

The method transitions to step 426 to remove the remaining metal artifacts 106. Step 426 is one of the steps included within an optional processing loop 430 that begins with step 420. In addition to steps 420 and 426, the processing loop includes steps 428 and 418. The processing loop is utilized to remove metal artifacts that remain in the equivalent low-Z tomographic volume data set 512, typically due to X-ray CT system 200 resolution limits.

In step 426, the image processor 120 performs forward projection of the equivalent low-Z tomographic data set 512 to generate a new set of equivalent low-Z projections 814, or Pi, where i=1, 2, . . . N or iteration number. An example of a generated new set of equivalent low-Z projections 814 is shown in FIG. 8E.

In step 428, the image processor 120 performs an integration of the portions shadowed by the high-Z metal from the i-iteration equivalent low-Z projections (Pi) 814 and the filtered equivalent low-Z projections (P0) 812 to create new i-iteration low-Z projections (Pi) 816, an example of which is shown in FIG. 8F. The integration operations could be various. For example, it could be a linear interpolation operation:

$$Pi'=a\times P0+(1-a)\times Pi, a\in[0,1]$$

Then, the method transitions to step 418 using the new i-iteration equivalent low-Z projections (Pi') 816 to create a new equivalent low-Z tomographic volume data set 512-1, an example of which is shown in FIG. 8G. The method then iteratively repeats the steps of processing loop 430 until the image quality of the equivalent low-Z tomographic volume data set 512 does not appreciably improve. In practice, 1 or 2 iterations in total are typically sufficient.

Finally, in step 422, the image processor 120 fuses the equivalent low-Z tomographic volume data set 512 with the segmented high-Z metal volume data set 506 to create a final tomographic volume data set 514 of the sample. The high-Z metal information in the segmented high-Z metal volume data set 506 is added back to the final tomographic volume data set 514 during the image fusion. In addition, the artifacts 106 from the baseline tomographic volume data set 504 are significantly reduced or removed. Examples of the final tomographic volume data set 514 are shown in FIG. 5G and in FIG. 8H.

Figure 3B:
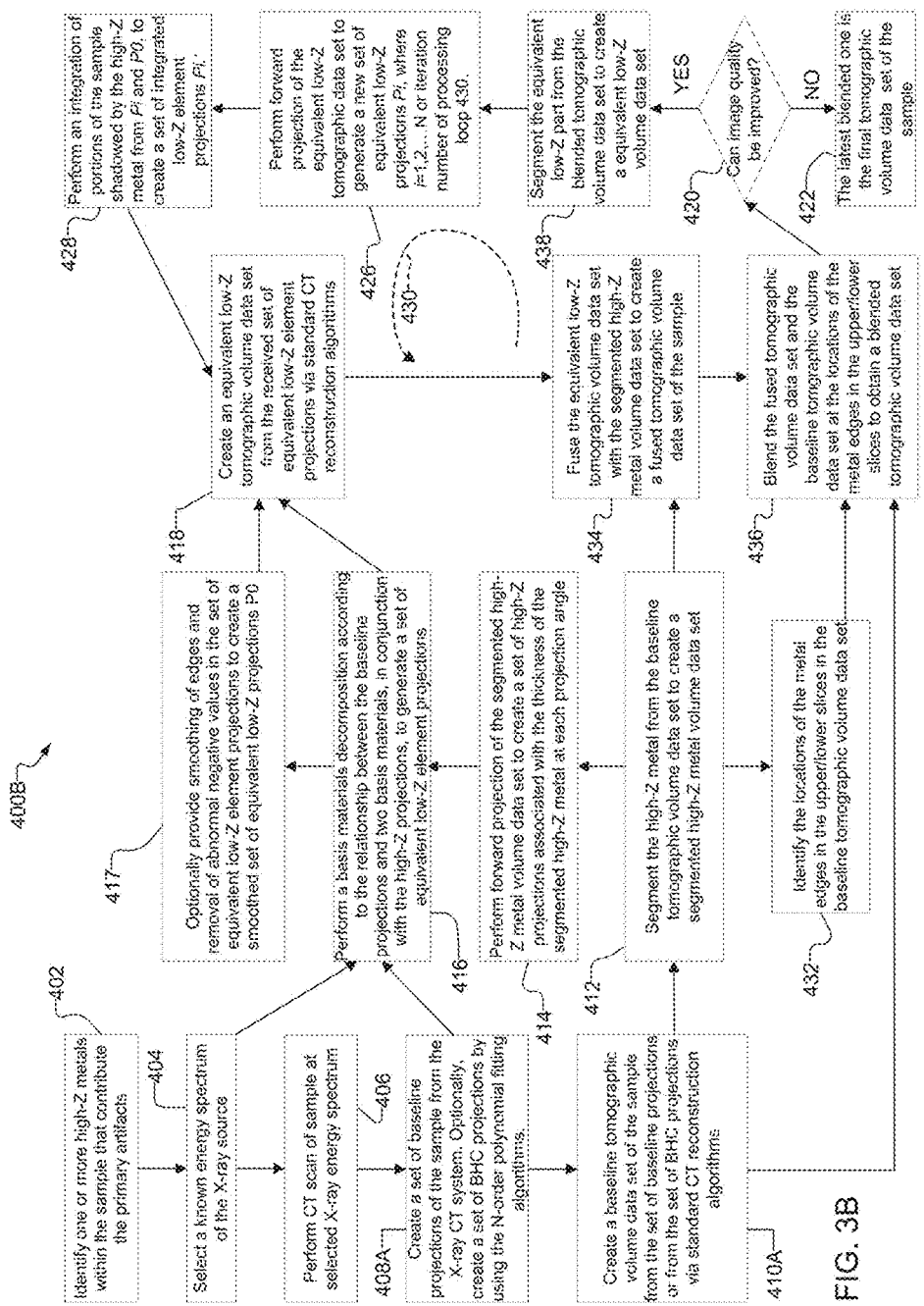
FIG. 3B is a flow chart showing the 3D reconstruction method according to a second embodiment.

FIG. 3B shows a flowchart that provides detail for the second embodiment of the MAR method 400B that is executed by the image processor 120 of the computer system 124 or other computer system using the x-ray projections from the detector system 118.

Most of steps are almost identical to similarly numbered steps in the first embodiment of FIG. 3A, but the differences are as follows:

As in the previous embodiment, steps 402, 404, and 406 are performed.

Then, a variant step 408A is performed. The image processor 120 of the computer system 124 creates a set of baseline projections 502 of the sample 114 as in the previous example. In some implementations, however, the image processor 120 further creates a set of BHC projections by using N-order polynomial fitting algorithms to correct beam hardening effects from the original baseline projections. For background, see 1) BEAM-HARDENING IN SIMULATED X-RAY TOMOGRAPHY, by Ramakrishna, et al., Nuclear & Mechanical Engineering, Indian Institute of Technology, Kanpur India (2006); or 2) Development and quantitative assessment of a beam hardening correction model for pre-clinical micro-CT, Sucheta Mohapatra, Thesis, University of Iowa (2012).

In step 410A, the image processor 120 creates a baseline tomographic volume data set 504 of the sample from the baseline projections 502, or creates a BHC baseline tomographic volume data set 504-1 from the BHC projections, instead.

In additional step 432 after step 412, the image processor 120 identifies the locations of the metal edges in the upper/lower slices in the baseline tomographic volume data set 504 or BHC baseline tomographic volume data set 504-1.

In additional step 434 after step 418, the image processor 120 fuses the equivalent low-Z tomographic volume data set 512 with the segmented high-Z metal volume data set 506 to create a fused tomographic volume data set 514 of the sample.

In additional step 436, the image processor 120 blends the fused tomographic volume data set 514 and the baseline tomographic volume data set 504 or 504-1 at the locations of the metal edges in the upper/lower slices to obtain a blended tomographic volume data set 514-1.

Figure 10B:
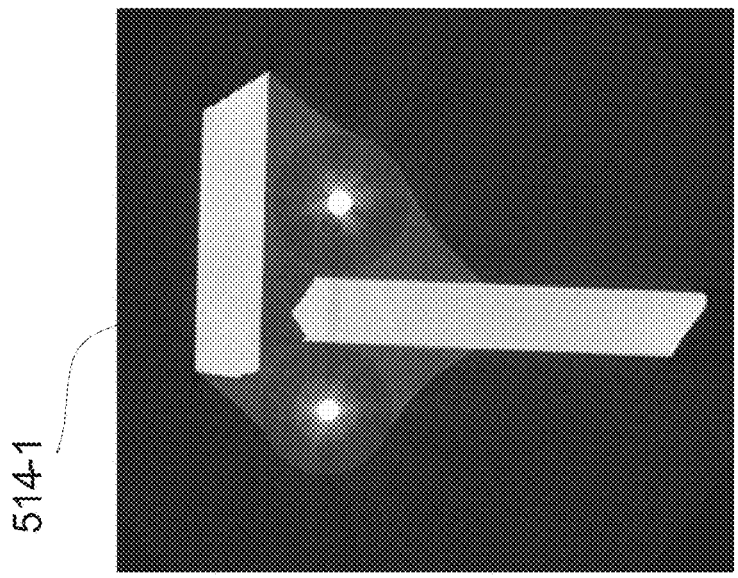
FIGS. 10A and 10B show advantages of the 3D reconstruction method of the second embodiment of FIG. 3B.
Figure 10A:
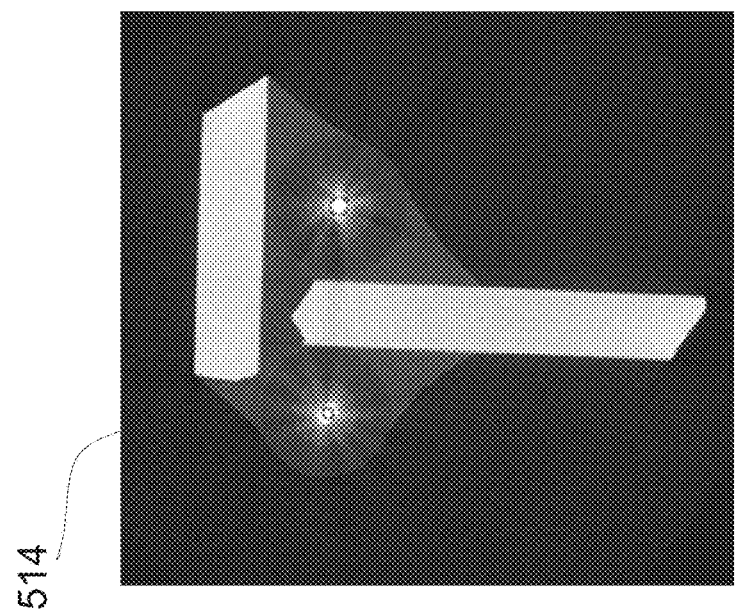

In FIG. 10A and FIG. 10B, the artifacts induced by insufficient pixels representing the metal in the fused tomographic volume data set 514 are reduced by blending with the BHC baseline tomographic volume data set 504-1.

Then, according to step 420, if the image quality is optimal or sufficient, the MAR method of the invention transitions to step 422 directly to regard the latest blended tomographic volume data set 514-1 as the final tomographic volume data set of the sample 114.

Otherwise, the image processor 120 does the same optional iterative operation provided by the steps of the processing loop 430 of the MAR method 400B as the basic workflow by repeating steps 426, 428, 418, and 434.

The only difference in the loop 430 for the method of FIG. 3B is that the equivalent low-Z volume data set 512 is created by segmenting the equivalent low-Z part from the blended tomographic volume data set 514-1 in step 438.

Figure 4A:
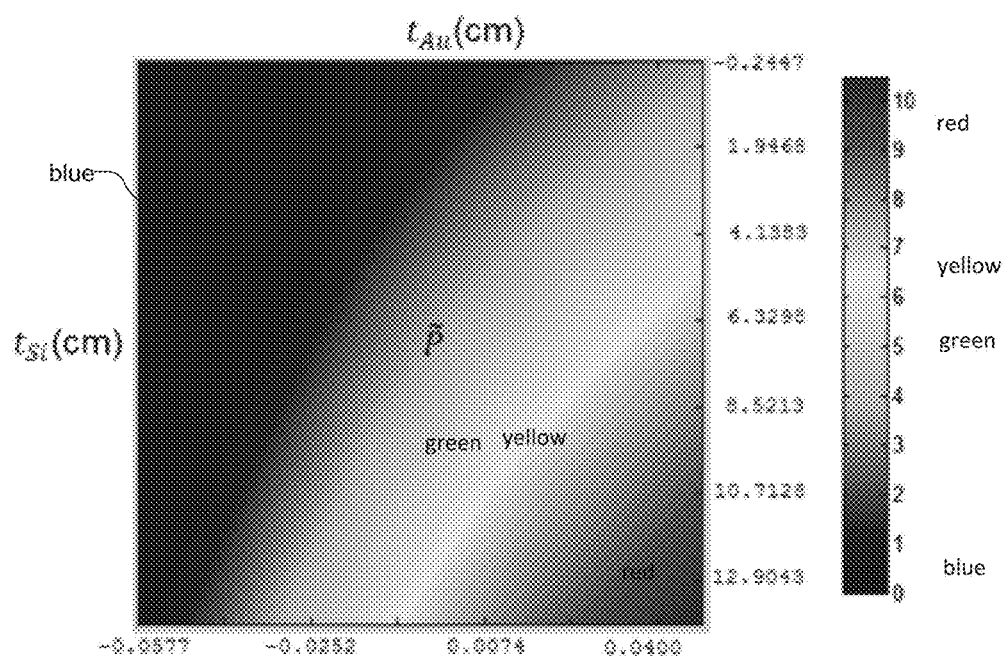
FIGS. 4A and 4B show Look Up Tables (LUT) for determining a relationship between the baseline projections and two basis materials at the selected energy.
Figure 4B:
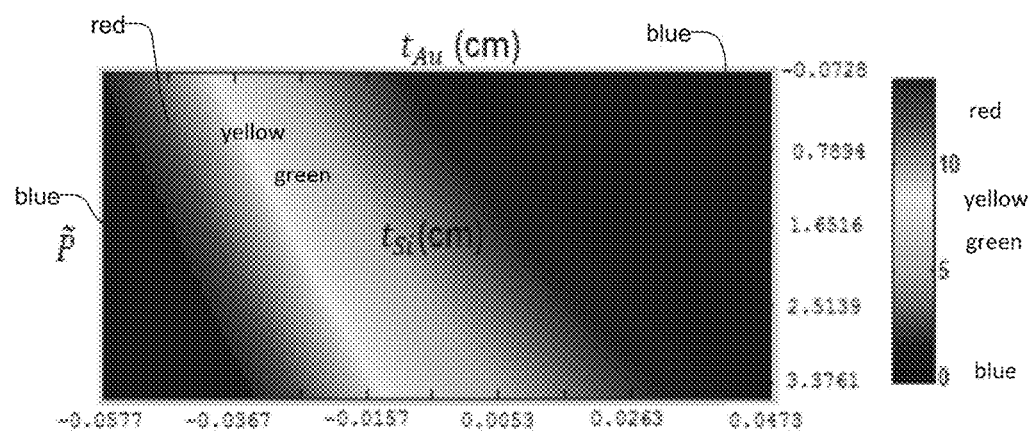

FIGS. 4A and 4B show look-up tables (LUTs) utilized for removing metal artifacts. LUTs are built using a priori knowledge of elements within the sample. For a given energy spectrum, LUTs provide X-ray attenuation values for elements as a function of element thickness. For example, suppose the primary metal is Au and the equivalent low-Z element is Si. The X-ray attenuation (i.e. transmission), $\tilde{P}$, of a sample consisting of Au and Si with different thickness, $t_{Au}$ and $t_{Si}$, could be calculated in theory at a given spectrum, $D(E)$:

$$\tilde{P} = P(t_{Au}, t_{Si}) = -\ln\left(\frac{I}{I_0}\right) = -\ln\left\{\int D(E) e^{-[u_{Au}(E)t_{Au} + u_{Si}(E)t_{Si}]} dE\right\}$$

According to the above formula, an initial LUT can be built as shown in FIG. 4A. The y-axis denotes $t_{Si}$, x-axis denotes $t_{Au}$ and the values in the table denote $\tilde{P}$. Then, invert P=P($t_{Au}$, $t_{Si}$) into $t_{Si}$=F($\tilde{P}$, $t_{Au}$) and an inverted LUT could be built from the initial LUT as shown in FIG. 4B.

In FIG. 4B, the y-axis denotes $\tilde{P}$, x-axis denotes $t_{Au}$ and the values in the table denote $t_{Si}$. In practice, the projections in actual cases are regarded to be equivalent to P, then the thickness of the equivalent low-Z element, $t_{Si}$, is calculated with the known projection values, $\tilde{P}$, and the thickness of the metal, $t_{Au}$ by using the inverted LUT. The image processor 120 creates a set of equivalent low-Z element projections 510 based on the high-Z element projections 508 and the baseline projections 502. Each of the projections in the set of equivalent low-Z projections 510 provides information associated with the thickness of the equivalent low-Z element at each projection angle formed when rotating the sample 114 in the X-ray beam 103. An exemplary set of equivalent low-Z projections 510 is shown in FIG. 5E.

Figure 6B:
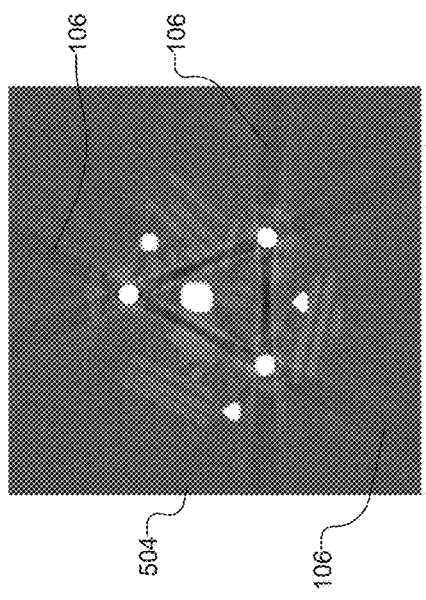
FIGS. 6B-6D show tomographic images for the sample in FIG. 6A via different methods, with FIG. 6B showing a baseline tomographic image with uncorrected artifacts created using standard CT reconstruction algorithms, FIG. 6C showing a final tomographic image created using the MAR method of the present invention to remove artifacts associated with a single high-Z metal element structures, Gold (Au), and FIG. 6D showing a final tomographic image of the sample created using the MAR method of the present invention to remove artifacts associated with two high-Z elements, Gold (Au) and Iron (Fe)
Figure 6D:
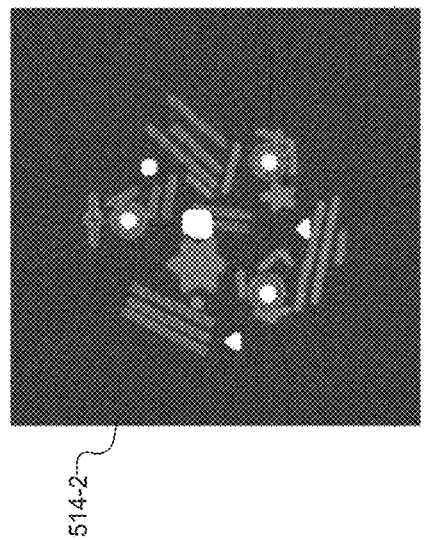
Figure 6A:
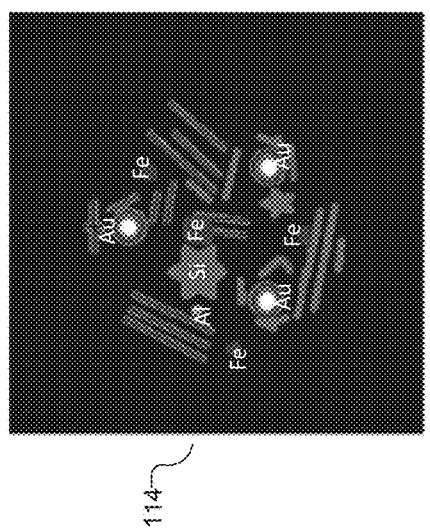
FIG. 6A shows an ideal phantom design of an exemplary sample including multiple elements.
Figure 6C:
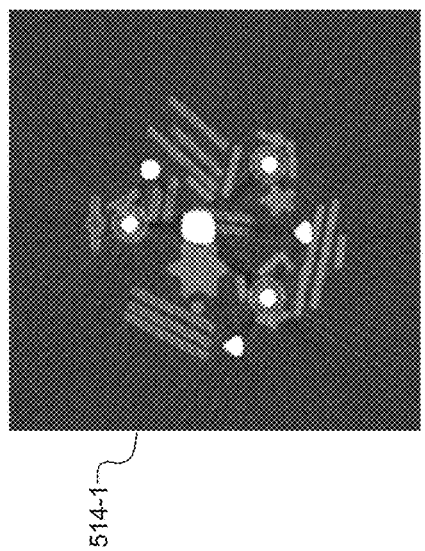

FIG. 6A shows a phantom or model design of an exemplary sample 114 including multiple high-Z elements such as Fe, Au, and low-Z elements, Si and Al. FIG. 6B shows a baseline tomographic volume data set 504 of the sample 114 in FIG. 6A using current CT reconstruction techniques. Artifacts 106 are uncorrected in the baseline tomographic volume data set 504. FIG. 6C shows a final tomographic volume data set 514-1 of the sample 114 generated using the method of FIG. 3A when the operator selects Au as the high-Z element and Si as the equivalent low-Z element for basis materials decomposition. The streak artifacts 106 associated with high-Z metal Au are removed in the final tomographic volume data set 514-1 of the sample 114.

FIG. 6D shows a final tomographic volume data set 514-2 of the sample 114 generated using the MAR method of FIG. 3A when the operator selects two high-Z metals, Au and Fe as the high-Z element, and Si as the equivalent low-Z element for basis materials decomposition. The streak artifacts 106 associated with each of the metals Au and Fe are removed in the final tomographic volume data set 514-2 of the sample 114.

Figure 7:
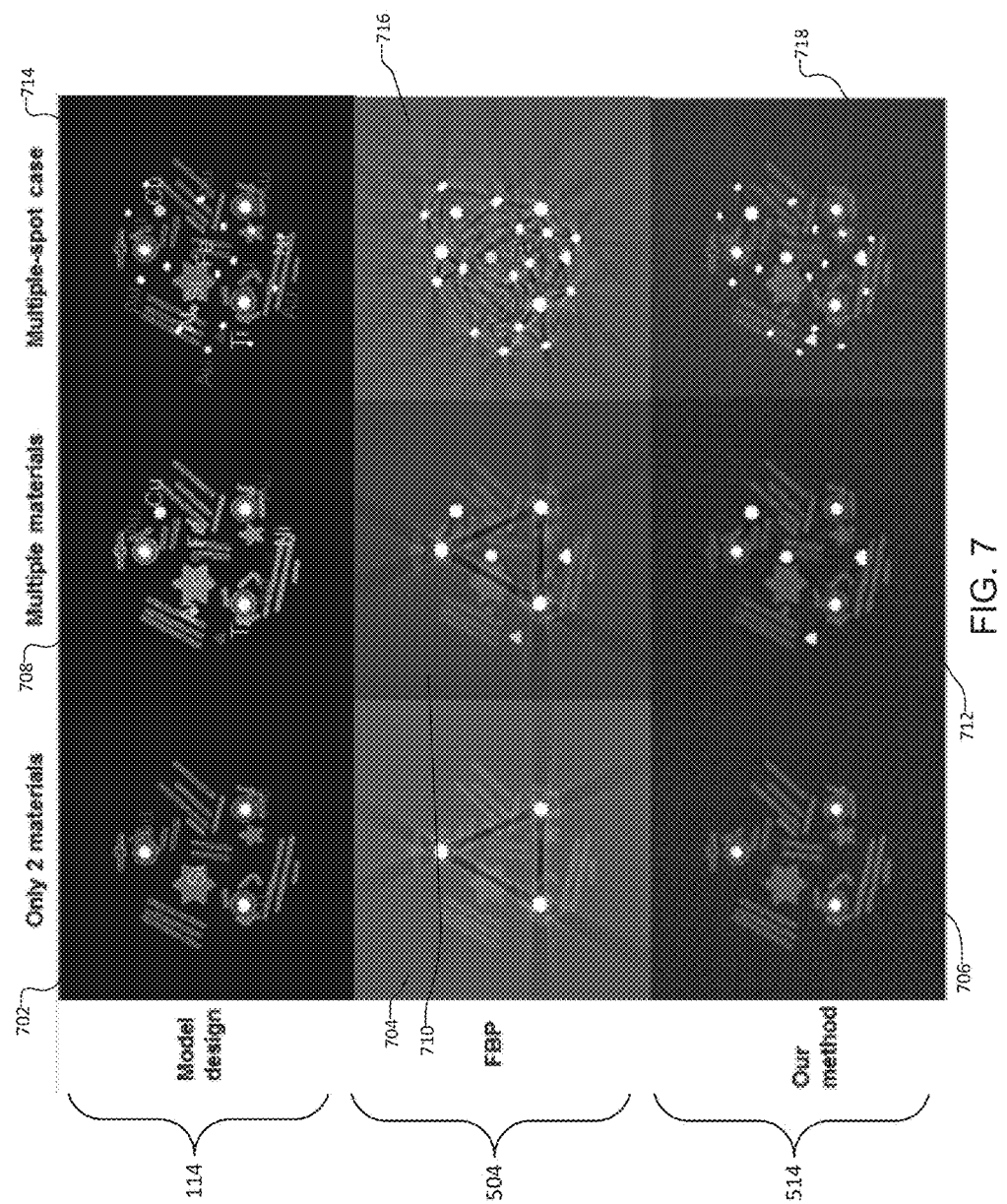
FIG. 7 shows results using the MAR method of the present invention and using standard Filtered Back Projection (FBP) techniques to remove artifacts from different exemplary samples.

FIG. 7 shows results using the MAR method of the present invention and using standard Filtered Back Projection (FBP) techniques for different exemplary samples. For all examples, Au is the high-Z element and Si is selected as the equivalent low-Z element. Reference 702 indicates one high-Z metal and one low-Z element in a sample 114. This is also known as a simple case.

The first row shows ideal phantom (or model) exemplary sample designs. The second row of shows tomographic images generated for each example using standard CT reconstruction algorithms such as FBP with uncorrected artifacts. The third row shows final tomographic images generated for each example using the MAR method of the present invention for comparison.

Reference 708 indicates multiple high-Z metals/materials and one or more low-Z elements 708 in a sample 114, also known as the multiple materials case. In the multiple materials case 708, typically only one high-Z metal primarily contributes to the artifacts.

Reference 714 indicates multiple spots of one high-Z metal that contributes artifacts in the sample 114 and includes one or more low-Z elements. This is also known as a multiple spot case.

References 704, 710 and 716 indicate baseline tomographic volume data sets 504 of the simple case 702, the multiple material case 708 and the multiple spot case 714, respectively. In a similar fashion, references 706, 712 and 718 are final tomographic volume data sets 514 generated using the method of FIG. 3A for the samples 114 of cases 702, 708 and 714, respectively. These images illustrate that the method of the present invention can be extended to remove metal artifacts in multiple-material and multiple-spot cases.

FIG. 8A-8H show images generated during processing of an exemplary sample including metal artifacts using the MAR method 400A of FIG. 3A or the MAR method 400B of FIG. 3B. Each of the images represents output at different steps of the MAR method 400A/400B.

In the example, the X-ray CT system 200 that implements the MAR method 400A/400B has a resolution limit that creates additional artifacts during the creation of the equivalent low-Z element projections 510. The optional iterative operation provided by the steps of the processing loop 430 of the MAR method 400A/400B is utilized to reduce unexpected resolution-limit-induced metal artifacts of the sample and to improve image quality of the final tomographic volume data set.

Figure 8A:
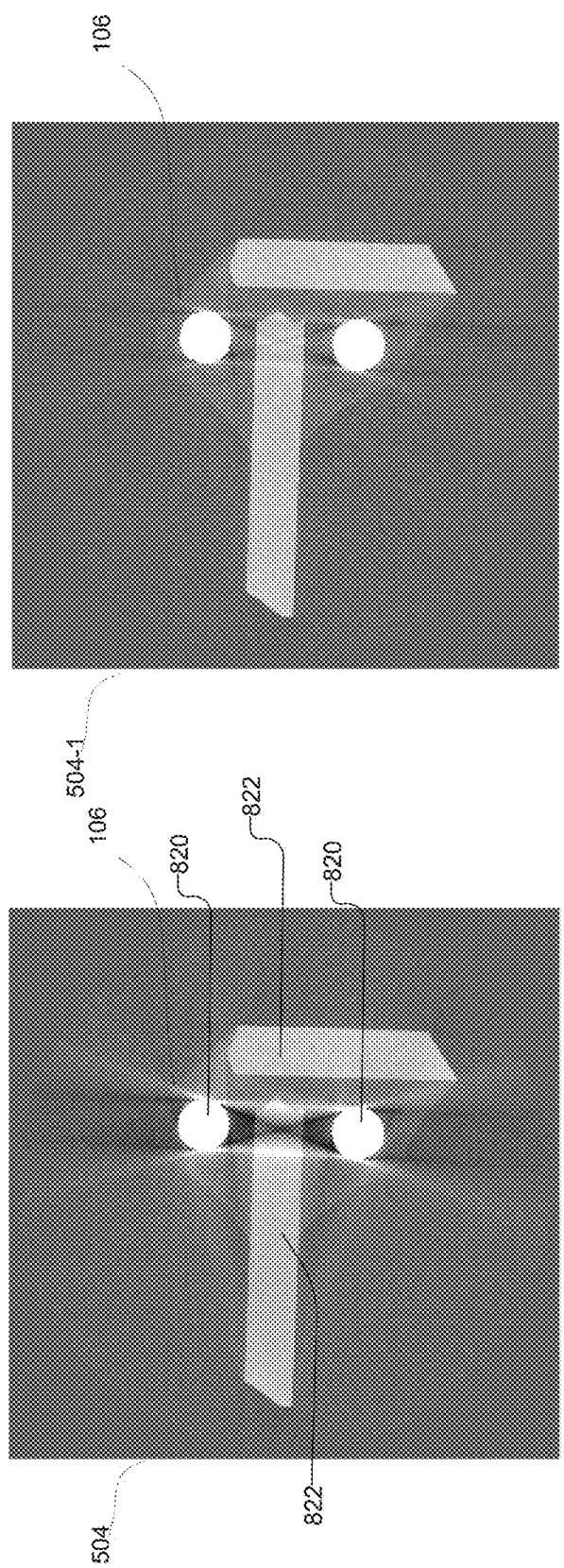

FIG. 8A shows an exemplary baseline tomographic volume data set 504 of a sample that was created using current CT reconstruction techniques. For reference, structures 820 are chrome steel and structures 822 are silicon. Generally, chrome can cause serious metal artifacts within the baseline tomographic volume data set 504.

FIG. 8A also shows an exemplary BHC baseline tomographic volume data set 504-1 by using a N-order polynomial fitting algorithm to correct beam hardening effects from the baseline projections.

FIG. 8A represents the output of step 410A of the MAR method 400B of FIG. 3B.

FIG. 8B shows an original set of equivalent low-Z projections 510 created by step 416 of the MAR method 400B. Because of the resolution limit of the X-ray CT system 200, the original set of equivalent low-Z projections 510 includes spikes and abnormal negative values that will significantly affect the image quality of an equivalent low-Z volume data set 512 reconstructed from the set of equivalent low-Z projections 510. Thus, some additional operations could be performed to eliminate these artifacts. For example, the edges in the reconstructed images can be smoothed or filtered to remove the spikes, and the abnormal negative values can be removed (i.e., non-negative constraint).

FIG. 8C shows a set of filtered equivalent low-Z projections (P0) 812 created by removing sharp edges or spikes and removing abnormal negative values from the original equivalent low-Z projections 510 in FIG. 8B. Because the set of filtered equivalent low-Z projections 812 is associated with the baseline set of projections 510 and is not associated with the iterative processing loop 430, the set of filtered equivalent low-Z projections 812 are additionally labeled as P0 in FIG. 8C. FIG. 8C represents the output of step 417 of the MAR method 400B.

FIG. 8D shows an equivalent low-Z tomographic volume data set 512 which is reconstructed using the filtered equivalent low-Z projections (P0) 812 in FIG. 8C. FIG. 8D represents the output of step 418 of the MAR method 400B. The metal artifacts in the equivalent low-Z tomographic volume data set 512 are much fewer/lighter than in the baseline tomographic volume data set 504 and 504-1, but they can typically be reduced further with the iterative processing loop 430.

FIG. 8E shows a new set of equivalent low-Z projections (Pi) 814 generated by forward projecting the equivalent low-Z tomographic volume data set 512 of FIG. 8D. FIG. 8E represents the output of step 426 of the MAR method 400B. The new set of equivalent low-Z projections Pi are generated in response to the determination in MAR method 400B, step 420, that the image quality of the equivalent low-Z tomographic volume data set 512 is insufficient. Because it is the set of projections created during the first pass of processing loop 430, or iteration i=1, the new set of equivalent low-Z projections 814 is additionally labeled as P1 in FIG. 8E.

The optional processing loop 430 is utilized to iteratively remove artifacts introduced during the creation of the equivalent low-Z projections 510. The new artifacts were introduced due to resolution limitations of the X-ray CT system 200 implementing the MAR method 400B.

FIG. 8F shows a set of integrated equivalent low-Z projections, also known as integrated low-Z projections (Pi') 816. The integrated low-Z projections 816 are generated by integrating parts or portions of the sample 114 shadowed by the high-Z metal, from the new set of equivalent low-Z projections 814 (P1) and from the set of filtered equivalent low-Z projections (P0) 812. Because the set of integrated low-Z projections 816 is associated with the set of projections created during the first pass of processing loop 430, or iteration i=1, the first set of integrated low-Z projections 816 are additionally labeled as P1' in FIG. 8F.

FIG. 8G shows a new equivalent low-Z tomographic volume data set 512-1 with reduced metal artifacts, which is reconstructed using the integrated low-Z projections 816, or P1'. In the example, further iterations of the processing loop 430 did not experimentally yield any appreciable improvements to the image quality of the equivalent low-Z tomographic volume data set 512-1 beyond that provided by the first iteration of the processing loop 430 and P1'. FIG. 8G represents the output of step 420 of the MAR method 400B upon determining that the image quality of the equivalent low-Z tomographic volume data set 512 cannot be appreciably improved by performing more iterations of processing loop 430.

FIG. 8H shows the final tomographic volume data set 514 created by fusing the new equivalent low-Z tomographic volume data set 512-1 of FIG. 8G and the segmented high-Z metal volume data set 506. FIG. 8H represents the output of step 422 of the MAR method 400B.

Figure 9:
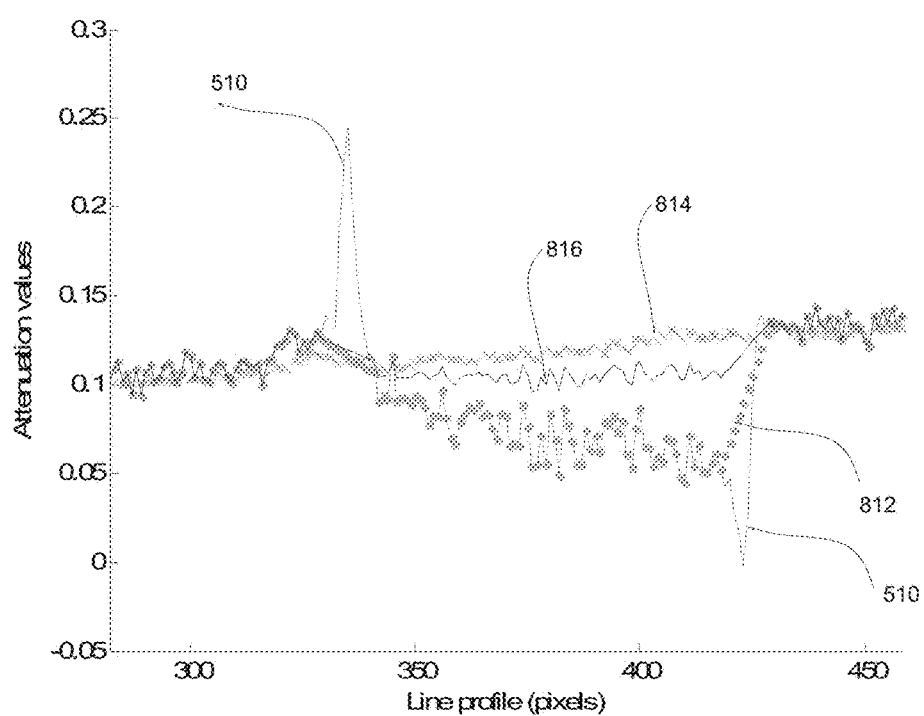
FIG. 9 shows a plot of attenuation versus number of pixels for line-profile comparisons of projections created using the MAR method of the present invention for the example shown in FIG. 8A-8H.

FIG. 9 shows line-profile comparisons among the original equivalent low-Z projections 510, filtered equivalent low-Z projections (P0) 812, forward-projected equivalent low-Z projections (P1) 814 and integrated low-Z projections (P') 816. The spikes in the original equivalent low-Z projections 510 are removed or reduced in the filtered equivalent low-Z projections (P0) 812 and subsequent projections 814 and 816.

The values of the portions within the sample 144 shadowed by the high-Z metal are optimized in the set of integrated low-Z projection (P1') 816, per MAR method 400B step 428. As a result, the equivalent low-Z tomographic volume data set 512-1 reconstructed from the set of integrated low-Z projection (P1') 816 includes fewer metal artifacts 106.

FIG. 10A shows a final tomographic volume data set 514 of a sample 114 that was created in accordance with method 400B of FIG. 3B. In the upper slices of the volume data set 514 there are artifacts around the edges of the metal objects. These artifacts are induced by insufficient pixels of the metal in basis materials decomposition. The iterative processing loop 430 of the embodiment of FIG. 3B is then adopted to reduce the artifacts by blending the slices having the artifacts in the final tomographic volume data set 514 of FIG. 10A with the BHC baseline tomographic volume data 504-1, shown in FIG. 8A, The result of this operation produces the final reconstructed tomographic volume data set 514-1 shown in FIG. 10B.

Correspondingly, the final reconstructed tomographic volume data set 514-1 of FIG. 10B created from blending the BHC baseline tomographic volume data set 504-1 with the fusion of the equivalent low-Z tomographic volume data set 512-1 and the segmented high-Z metal volume data set 506 includes fewer metal artifacts 106.

Figure 11:
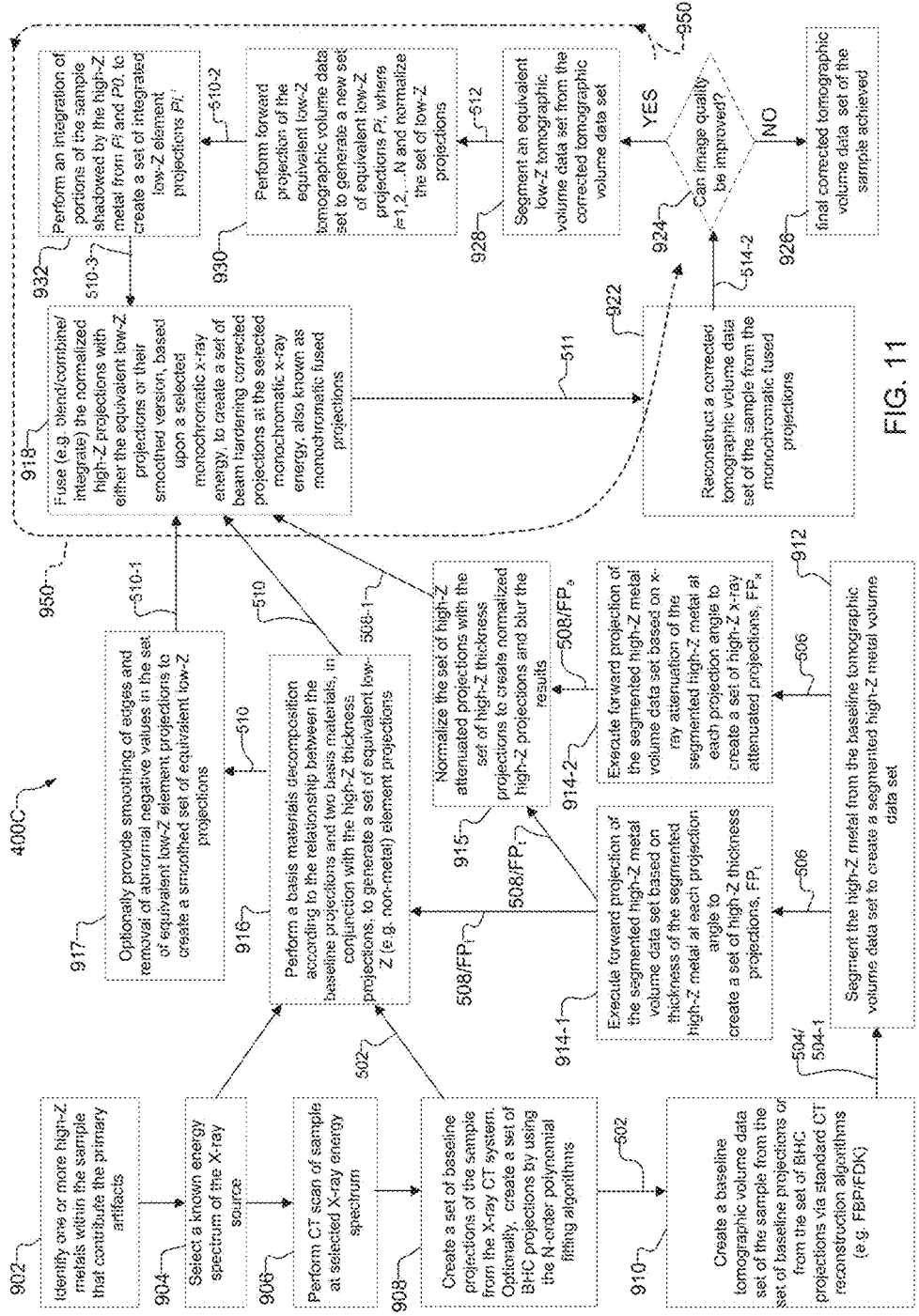
FIG. 11 is a flow chart showing a MAR method of the present invention, according to a third embodiment.

FIG. 11 is a flowchart that provides detail for yet another, third, embodiment of a MAR method, indicated by reference number 400C. The MAR method 400C is based and improves upon the embodiment of the MAR method 400B of FIG. 3B.

Steps 902, 904, 906, 908, and 910 in method 400C are analogous to steps 402, 404, 406, 408A, and 410A of method 400B for creating an initial baseline tomographic volume data set 504/504-1 of the sample 114.

In step 902, high-Z metals in the sample 114 that contribute the primary artifacts 106 are identified. Generally, there is a priori knowledge of the presence of high-Z elements and the type of those elements in the sample 114 that contribute to creation of the primary artifacts 106, and thus, this information is entered by an operator. For example, in most semiconductor manufacturing processes, the elemental constituents are already known and well defined. In other examples, this information is determined by image analysis by the image processor 120. Usually, one or more high-Z metals are selected.

In step 904, the operator selects a voltage setting of the X-ray source 102 that includes the influence of the sensitivity of the detector system 118. This operation is also known as defining an effective energy spectrum. In examples, selection of the effective energy spectrum is also associated with selecting filters 107 of the scan parameters 232. The energy spectrum can be measured and/or estimated in advance by physical measurements or by simulation programs executed by the image processor 120.

According to step 906, the X-ray CT system 200 performs a CT scan of the sample 114 at a selected X-ray energy spectrum according to the scan parameters 232. In response to the scan, in step 908, the image processor 120 creates a set of baseline projections 502 of the sample 114 by rotating the sample in the X-ray beam 103 from the X-ray source 102 of the x-ray CT system 200. Moreover, in general, any scan trajectory can be used including spiral tomography where the sample 114 is rotated and translated at the same time, along with other continuous and discontinuous trajectories. In some implementations, however, the image processor 120 further creates a set of beam-hardening corrected (BHC) projections by using N-order polynomial fitting algorithms to correct beam hardening effects from the original baseline projections. The BHC projections, in turn, can then provide improved reconstruction for metal segmentation in step 910. However, the original baseline projections are still required for basis material decomposition step 916, included herein below.

In step 910, the image processor 120 either creates a baseline tomographic volume data set 504 of the sample from the baseline projections 502, or creates a BHC baseline tomographic volume data set 504-1 from the BHC baseline projections 502. The baseline tomographic volume data set 504 is often uncorrected for artifacts. Here, standard CT reconstruction algorithms can be used including filtered back projection and FDK method (FBP/FDK). In all subsequent steps of the method 400C, the volume data sets 504/504-1 created as a result of step 910 are referred to collectively as a baseline tomographic volume data set 504 of the sample 114.

Step 912 in method 400C of FIG. 11 is analogous to step 412 in method 400B. According to step 912, the high-Z metals are segmented from the baseline tomographic volume data set 504 to create a segmented high-Z metal volume data set 506.

Steps 914-1 and 914-2 accept the segmented high-Z metal volume data set 506 as input, and execute different forward projection operations upon the segmented high-Z metal volume data set 506. In step 914-1, method 400C executes forward projection (FP) of the segmented high-Z metal volume data set 506 based on thickness of the segmented high-Z metal at each projection angle to create a set of high-Z thickness projections 508/FP$_t$ associated with the thickness of the segmented high-Z metal at each projection angle. The set of high-Z thickness projections 508/FP$_t$ typically includes information associated with big cracks within the high-Z structures of the sample 114 because small cracks are swept off by the thickness threshold. Edges of the high-Z projections 508/FP$_t$ are also blurred.

In step 914-2, method 400C executes forward projection of the segmented high-Z metal volume data set 506 based on x-ray attenuation of the segmented high-Z metal at each projection angle to create a set of high-Z x-ray attenuated projections 508/FP$_a$. Unlike the set of high-Z thickness projections 508/FP$_t$, the set of high-Z x-ray attenuated projections FP$_a$ can include information for all cracks within the high-Z structures of the sample 114 because a thickness threshold is not utilized.

Step 915 receives both the set of high-Z thickness projections FP$_t$ and the set of high-Z x-ray attenuated projections FP$_a$ as input. The set of high-Z attenuated projections 508/FP$_a$ are additionally normalized with the set of high-Z thickness projections FP$_t$ and then blurred to create a set of normalized high-Z projections 508-1. The set of normalized high-Z projections 508-1 are temporarily set aside, and the method 400C transitions to step 916.

Steps 916 and 917 in method 400C are analogous to steps 416 and 417 in method 400B. In step 916, a basis materials decomposition is performed according to the relationship between the baseline projections 502 and two basis materials, in conjunction with the high-Z thickness projections 508/FP$_t$, to generate a set of equivalent low-Z (non-metal) element projections 510. It is also important to note that the basis materials decomposition of step 916 is executed using the same energy spectrum of the x-ray source utilized in step 904 when creating the set of baseline projections 502.

In step 917, the image processor 120 optionally performs an operation to filter or smooth edges (i.e., spikes) and to remove abnormal negative values (i.e., non-negative constraint) in the set of equivalent low-Z element projections 510 to create a smoothed set of equivalent low-Z projections (P0). Reference number 510-1 indicates the optional smoothed versions of the equivalent low-Z projections created in step 917.

Then, the method transitions to step 918, which accepts as input the set of normalized high-Z projections 508-1 created in step 915, in conjunction with either the equivalent low-Z projections 510 created in step 916 or their smoothed versions 510-1 from step 917.

In step 918, the method 400C fuses (e.g. blends/combines/integrates) the normalized high-Z projections 508-1, with either the low-Z projections 510 or the smoothed low-Z projections 510-1, based upon a selected monochromatic x-ray energy. As a result, a set of monochromatic fused projections 511 of the sample 114 is created upon conclusion of step 918, where virtually all beam hardening artifacts have been removed from the monochromatic fused projections 511. It is important to note that providing the set of normalized high-Z projections 508-1 as input to the fusion process in step 918 is the key differentiator for improving image quality for the high-Z projections as compared to the fusion process executed in step 428 of FIGS. 3A and 3B. No mask is needed.

In step 922, the method 400C then reconstructs a corrected tomographic volume data set 514-2 of the sample from the monochromatic fused projections 511. The fact that a corrected tomographic volume data set 514-2 is directly reconstructed from the monochromatic fused projections is the main advantage of this method over the methods 400A and 400B.

According to step 924, the method 400C determines whether the image quality of the corrected tomographic volume data set 514-2 can be improved. In many cases, no additional processing is required. If no improvements are necessary, the method 400C terminates in step 926. Otherwise, the method transitions to step 928, in accordance with an iterative processing loop 950 for improving the corrected tomographic volume data set 514-2.

Step 928 is the first step in iterative processing loop 950 for improving the image quality of the corrected tomographic volume data set 514-2. The processing loop also includes steps 930, 932, 918, 922, and 924. In step 928, the method 400C segments an equivalent low-Z tomographic volume data set 512 from the corrected tomographic volume data set 514-2. In step 930, the method 400C performs forward projection of the equivalent low-Z tomographic volume data set 512 provided from step 928 to generate a new set of equivalent low-Z projections Pi, where i=1, 2, . . . N and normalizes the set of equivalent low-Z projections. The new set of equivalent low-Z projections are indicated as reference 510-2.

In step 932, the method 400C performs an integration of portions of the sample 114 shadowed by the high-Z metal from Pi and P0, to create a set of integrated low-Z element projections Pi.' The set of integrated low-Z element projections Pi.' are indicated by reference 510-3.

In step 918, the set of (integrated) low-Z projections 510-3 are combined with the normalized high-Z projections 508-1 based upon the same monochromatic x-ray energy selected to create new monochromatic fused projections 511. A new corrected tomographic volume data set 514-2 is then generated/reconstructed from the corrected versions of the new monochromatic fused projections 511.

Finally, in step 924, the method 400C again determines whether the image quality of the corrected tomographic volume data set 514-2 can be improved. Experimentation has shown that if improvements to image quality were initially determined to be possible, typically no more than two iterations of the steps associated with processing loop 950 are required to achieve optimal improvements to the image quality of the corrected tomographic volume data set 514-2.

In summary, the embodiment of the MAR method 400C of FIG. 11 improves upon the embodiments of MAR method 400A and method 400B in several ways. In one example, after the initial creation of the baseline tomographic volume data set 504 of the sample 114, all subsequent operations associated with fusion of images in method 400C are executed in image projection space rather than in reconstructed image space, as in method 400A/400B. For this purpose, fusion of the high-Z projections and equivalent low-Z projections is executed in accordance with the x-ray attenuation by metal (high-Z) and non-metal (low-Z) structures for the selected monochromatic x-ray energy. In another example, method 400C executes beam hardening correction upon the high-Z and equivalent low-Z projections directly. This eliminates the need to identify metal edges and their effects in the baseline volume data set for beam hardening correction purposes, as in method 400B.

Instead of identifying metal edges and their effects in the baseline volume data set for beam hardening correction purposes, as in method 400B, method 400C retains metal features such as edge effects, cracks, and voids within the high-Z projections 508 by executing an additional FBP step, step 914-2. Step 914-2 creates the set of high-Z x-ray attenuated projections $FP_a$, and then normalizes the set of high-Z x-ray attenuated projections $FP_a$ with the set of high-Z thickness projections FP in step 915 to create a set of normalized high-Z projections 508-1. Because identification of metal edges in image volumes is a computationally-intensive process, elimination of this step in method 400C saves on processing time and provides significant computational efficiency over that provided in the MAR embodiment of method 400B in FIG. 3B.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data acquisition and image reconstruction method for an x-ray computed tomography system, the method comprising:
    creating a set of baseline projections of a sample;
    creating a baseline tomographic volume data set of the sample from the set of baseline projections;
    segmenting high-Z structures from the baseline tomographic volume data set to create a segmented high-Z volume data set;
    generating a set of high-Z projections from the segmented high-Z volume data set;
    generating a set of equivalent low-Z projections using the set of high-Z projections taking into account an energy spectrum of an x-ray beam;
    generating a set of high-Z thickness projections based on a thickness of the high-Z structures of the segmented high-Z, volume data set;
    generating a set of x-ray attenuated projections based on x-ray attenuation of the high-Z structures of the segmented high-Z volume data set;
    creating a set of normalized high-Z projections by normalizing the set of x-ray attenuated projections with the set of high-Z thickness projections;
    fusing the equivalent low-Z projections with the normalized high-Z projections, based upon a selected monochromatic x-ray energy of the energy spectrum of the x-ray beam, to create a set of monochromatic fused projections at the selected x-ray energy; and
    reconstructing a corrected tomographic volume data set from the monochromatic fused projections.

2. A method as claimed in claim 1, wherein the set of baseline projections of the sample are generated by rotating the sample relative to the X-ray beam from an x-ray source.

3. A method as claimed in claim 2, wherein the x-ray beam is a polychromatic beam.

4. A method as claimed in claim 2, wherein the x-ray source is a laboratory x-ray source.

5. A method as claimed in claim 2, wherein the x-ray source is a white synchrotron beam or accelerator-based source.

6. A method as claimed in claim 1, wherein the equivalent low-Z projections in the set of equivalent low-Z projections provide information associated with a thickness of an equivalent low-Z structure.

7. A method as claimed in claim 1, further comprising generating the set of high-Z projections by performing forward projection of the segmented high-Z volume data set.

8. A method as claimed in claim 7, further comprising performing a blur of the set of high-Z projections to match the CT system resolution limit.

9. A method as claimed in claim 1, further comprising generating the segmented high-Z volume data set by identifying a high-Z metal of the high-Z structures of the sample that contributes metal artifacts, and selecting thresholds for segmenting the high-Z metal from the baseline tomographic volume data set.

10. A method as claimed in claim 1, further comprising using N-order polynomial fitting beam-hardening corrected (BHC) projections as baseline projections and related BHC reconstructed tomographic volume data set as the baseline tomographic volume data set.

11. A method as claimed in claim 1, wherein the set of equivalent low-Z element projections is generated from the set of high-Z projections by a basis materials decomposition procedure according to a relationship among the baseline projections and basis materials.

12. A method as claimed in claim 11, wherein the basis materials decomposition procedure comprises:
identifying a high-Z metal of the sample contributing metal artifacts and an equivalent low-Z element representing other elements of the sample as the basis materials, the segmentation being generated from the high-Z metal;
identifying X-ray attenuations of the equivalent low-Z element and the high-Z metal at the energy spectrum.

13. A method as claimed in claim 12, wherein, in the basis materials decomposition procedure, the basis materials consist of one high-Z metal and one equivalent low-Z element, or consist of two high-Z metals and one equivalent low-Z element, or consist of more than 2 high-Z metals and one equivalent low-Z element.

14. A method as claimed in claim 11, further comprising using a Look Up Table (LUT) to determine the relationship among the basis materials.

15. A method as claimed in claim 11, wherein the relationship includes at least one equivalent low-Z element and a high-Z metal and the X-ray attenuations of the at least one equivalent low-Z element and the high-Z metal at the energy spectrum.

16. A method as claimed in claim 11, further comprising using the relationship among the basis materials and X-ray attenuations of the equivalent low-Z element and high-Z metal at the energy spectrum, and using the baseline projections and forward-projected high-Z projections for calculating thickness of the equivalent low-Z element to be the equivalent low-Z element projections.

17. A method as claimed in claim 1, further comprising identifying new artifacts introduced during the generation of the set of equivalent low-Z projections, and reducing the new artifacts in the set of equivalent low-Z projections.

18. A method as claimed in claim 1, further comprising:
filtering the equivalent low-Z projections by removing sharp edges and abnormal negative values from the equivalent low-Z projections; and
reconstructing an equivalent low-Z tomographic volume data set from the filtered set of equivalent low-Z projections.

19. A data acquisition and image reconstruction method for an x-ray computed tomography system, the method comprising:
creating a set of baseline projections of a sample:
creating a baseline tomographic volume data set of the sample from the set of baseline projections;
segmenting high-Z structures from the baseline tomographic volume data set to create a segmented high-Z volume data set:
generating a set of high-Z, projections from the segmented high-Z volume data set;
generating a set of equivalent low-Z projections using he set of high-Z projections taking into account an energy spectrum of an x-ray beam; and
generating a corrected tomographic volume data set using the set of equivalent low-Z projections by an iterative operation, comprising:
creating a new forward-projected set of equivalent low-Z projections by performing forward projection based on a corrected equivalent low-Z tomographic volume data set generated from the set of equivalent low-Z projections;
identifying portions of the sample shadowed by high-Z structures of the sample;
creating a set of integrated low-Z projections by performing an integration on the new forward-projected set of equivalent low-Z element projections and the filtered set of equivalent low-Z projections for the identified portions of the sample;
reconstructing a new equivalent low-Z projections tomographic volume data set; and
creating a new corrected tomographic volume data set by fusing the new equivalent low-Z tomographic volume data set and the segmented high-Z volume data set.

20. A method as claimed in claim 1, further comprising improving image quality in unexpected artifacts in slices of reconstructed metal objects due to insufficient pixels of the metal in basis materials decomposition by identifying locations of metal edges in the slices and creating new metal-artifact-corrected tomographic volume data set by blending fused metal-artifact-corrected tomographic volume data set with the baseline tomographic volume data set in these identified slices.

21. An x-ray CT system, comprising:
an x-ray imaging system that generates a set of baseline projections by rotating a sample relative in an x-ray beam; and
a computer system that generates a baseline tomographic volume data set of the sample from the set of baseline projections, segments high-Z structures from the baseline tomographic volume data set to create a segmented high-Z volume data set, generates a set of high-Z projections from the segmented high-Z volume data set, generates a set of equivalent projections using the set of high-Z projections taking into account an energy spectrum of an x-ray beam, and generates a corrected tomographic volume data set using the equivalent low-Z element projections by: identifying locations of high-Z edges in upper and lower slices within the baseline tomographic volume data set, creating an equivalent low-Z volume data set from the equivalent low-Z projections, fusing the equivalent low-Z volume data set with the segmented high-Z volume data set to create a fused tomographic volume data set, and blending the fused tomographic volume data set and the baseline tomographic volume data set at the locations of the high-Z edges in the upper and lower slices within the baseline tomographic volume data set to create a blended tomographic volume data set as the corrected tomographic volume data set.

22. A system as claimed in claim 21, wherein the x-ray imaging system comprises an x-ray source that generates the x-ray beam, a rotation stage that rotates the sample in the x-ray beam and a detector system for detecting the x-ray beam after interaction with the sample.

23. A system as claimed in claim 22, wherein the x-ray beam is a polychromatic beam.

24. A system as claimed in claim 22, wherein the x-ray source is a. laboratory x-ray source.

25. A system as claimed in claim 22, wherein the x-ray source is a white synchrotron beams or accelerator-based source.

26. A system as claimed in claim 21, wherein the equivalent low-Z projections in the set of equivalent low-Z projections provide information associated with a thickness of the equivalent low-Z structure at each projection angle formed when rotating the sample in the x-ray beam.

27. A system as claimed in claim 21, wherein the computer system further creates a segmented high-Z volume data set of the sample from the baseline tomographic volume data set.

28. A system as claimed in claim 27, wherein the computer system generates a set of high-Z projections by performing forward projection of the segmented high-Z metal volume data set.

29. A data acquisition and image reconstruction method for an x-ray computed tomography system, the method comprising:
   creating a set of baseline projections of a sample;
   creating a baseline tomographic volume data set of the sample from the set of baseline projections;
   segmenting high-Z structures from the baseline tomographic volume data set o create a segmented high-Z volume data set:
   generating a set of high-Z projections from the segmented high-Z volume data set;
   generating a set of equivalent low-Z projections using the set of high-Z projections taking into account an energy spectrum of an x-ray beam; and
   generating a corrected tomographic volume data set using the set of equivalent low-Z projections by:
   identifying locations of high-Z edges in upper and lower slices within the baseline tomographic volume data set;
   creating an equivalent low-Z volume data set from the equivalent low-Z projections;
   fusing the equivalent low-Z volume data set with the segmented high-Z volume data set to create a fused tomographic volume data set; and
   blending the fused tomographic volume data set and the baseline tomographic volume data set at the locations of the high-Z edges in the upper and lower slices within the baseline tomographic volume data set to create a blended tomographic volume data set as the corrected tomographic volume data set.

* * * * *

UNITED STATES PATENT AND TRADEMARK OFFICE
CERTIFICATE OF CORRECTION

| | |
|---|---|
| PATENT NO. | : 10,297,048 B2 |
| APPLICATION NO. | : 15/337075 |
| DATED | : May 21, 2019 |
| INVENTOR(S) | : Zhifeng Huang and Thomas A. Case |

It is certified that error appears in the above-identified patent and that said Letters Patent is hereby corrected as shown below:

In the Claims

Claim 1, Column 22, Line 49 replace "high-Z, volume data set;" with --high-Z volume data set;--

Claim 19, Column 24, Line 11 replace "creating a set of baseline projections of a sample:" with --creating a set of baseline projections of a sample;--

Claim 19, Column 24, Line 16 replace "volume data set:" with --volume data set;--

Claim 19, Column 24, Line 19 replace "generating a set of equivalent low-Z projections using he" with --generating a set of equivalent low-Z projections using the--

Claim 20, Column 24, Line 46 replace "tions of metal edges in the slices and creating new metal-" with --tions of metal edges in the slices and creating a new metal- --

Claim 21, Column 24, Line 61 replace "set, generates a set of equivalent projections using the" with --set, generates a set of equivalent low–z projections using the--

Claim 24, Column 25, Line 20 replace "source is a. laboratory x-ray source." with --source is a laboratory x-ray source.--

Claim 29, Column 26, Lines 12-13 replace "graphic volume data set o create a segmented high-Z volume data set:" with --graphic volume data set to create a segmented high-Z volume data set;--

Signed and Sealed this
First Day of October, 2019

Andrei Iancu
*Director of the United States Patent and Trademark Office*